(12) United States Patent
Ohms et al.

(10) Patent No.: US 8,443,668 B2
(45) Date of Patent: May 21, 2013

(54) YAW RATE SENSOR

(75) Inventors: Torsten Ohms, Vaihingen/Enz-Aurich (DE); Burkhard Kuhlmann, Reutlingen (DE); Markus Heitz, Kusterdingen (DE); Robert Sattler, Regensburg (DE); Daniel Christoph Meisel, Vaihingen An Der Enz (DE); Thorsten Balslink, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 12/925,750

(22) Filed: Oct. 27, 2010

(65) Prior Publication Data
US 2011/0132087 A1 Jun. 9, 2011

(30) Foreign Application Priority Data
Nov. 6, 2009 (DE) .......................... 10 2009 046 506

(51) Int. Cl.
*G01C 19/56* (2012.01)
(52) U.S. Cl.
USPC ...................................... 73/504.12

(58) Field of Classification Search
USPC .......................................... 73/504.12, 504.14
See application file for complete search history.

(56) References Cited

U.S. PATENT DOCUMENTS 7,313,958 B2 * 1/2008 Willig et al. ............... 73/504.12
8,261,614 B2 * 9/2012 Hartmann et al. ......... 73/504.12

FOREIGN PATENT DOCUMENTS

| DE | 195 30 007 | | 2/1997 |
| DE | 101 08 197 | | 9/2002 |
| DE | 101 08 196 | | 10/2002 |
| DE | 102 37 410 | | 8/2003 |
| WO | WO2007/104742 | * | 9/2007 |

* cited by examiner

*Primary Examiner* — John Chapman, Jr.
(74) *Attorney, Agent, or Firm* — Kenyon & Kenyon LLP

(57) ABSTRACT

A yaw rate sensor having a substrate, a first Coriolis element and a second Coriolis element is described, the first Coriolis element being excitable to a first vibration by first excitation means, and the second Coriolis element being excitable to a second vibration by second excitation means, and the first and second Coriolis elements being connected to one another by a spring structure, and the spring structure also including at least one rocker structure, the rocker structure being anchored on the substrate by at least one spring element.

17 Claims, 23 Drawing Sheets

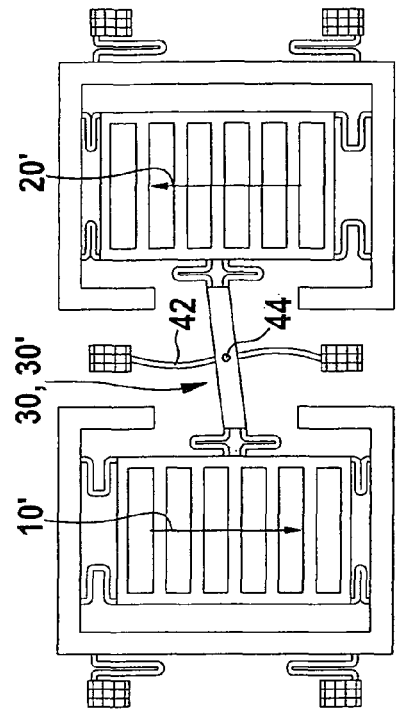
Fig. 10a
Fig. 10b
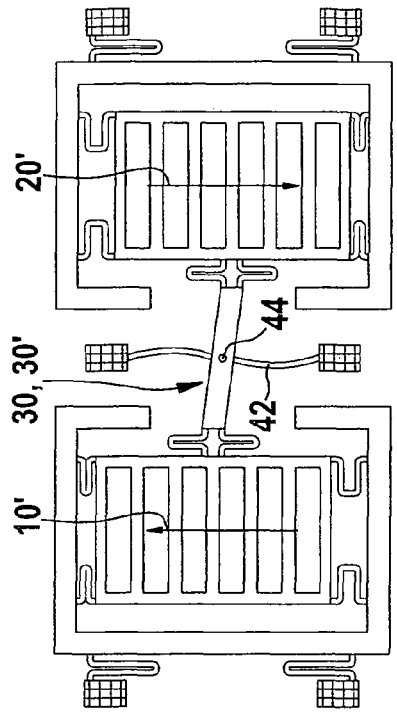
Fig. 10c
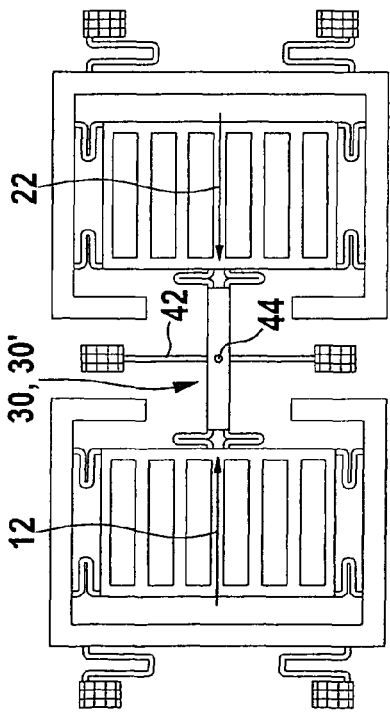
Fig. 10d

YAW RATE SENSOR

BACKGROUND OF THE INVENTION

1. Field of the Invention

The present invention is generally directed to a yaw rate sensor.

2. Description of Related Art

Such yaw rate sensors are known in general. For example, yaw rate sensors using Coriolis elements are known from published German patent documents DE 101 08 196 A1, DE 101 08 197 A1 and DE 102 37 410 A1, in which a first and a second Coriolis element in particular are joined to one another by a spring, and vibrations are excited in parallel to a first axis, a first and a second detection means detecting a deflection of the first and second Coriolis elements, based on a Coriolis force acting on the Coriolis elements perpendicularly to a first axis, so that the difference between a first detection signal of the first detection means and a second detection signal of the second detection means is a function of the Coriolis force and thus is also a function of the applied yaw rate, the axis of rotation being perpendicular to the surface normal of a main plane of extent of the yaw rate sensor. The first and second detection signals are evaluated capacitively in particular. In addition to such $\Omega_z$ yaw rate sensors, there are also known $\Omega_x$ yaw rate sensors, in which the Coriolis force acts perpendicularly to the main plane of extent (parallel to a third axis).

SUMMARY OF THE INVENTION

The yaw rate sensor according to the present invention has the advantage over the related art that the detection accuracy in detection of yaw rates is substantially increased. This is achieved by implementing the rocker structure, which is coupled to the substrate by the spring element, in the spring structure. With the present yaw rate sensor, the yaw rate is detected by the vibration of the first and second Coriolis elements in phase opposition perpendicularly to the main plane of extent ($\Omega_x$ sensor), which is also referred to below as the detection mode (alternatively, however, it is also conceivable for the structure to be designed in such a way that the detection mode lies in the main plane of extent ($\Omega_z$ sensor). This detection mode may have an unwanted interference mode superimposed on it, the interference mode including an in-phase vibration of the first and second Coriolis elements perpendicularly to the main plane of extent. To detect the detection mode undisturbed by influences of the interference mode as much as possible, it is advantageous if the frequencies of the interference modes and the detection modes are as far apart as possible. Since the rocker structure is designed to be stiff with respect to bending perpendicular or parallel to the main plane of extent in comparison with the coupling springs used in the related art, in-phase vibrations of the first and second Coriolis elements are suppressed or shifted toward higher frequencies. At the same time, the frequency of the vibration of the first and second Coriolis elements in phase opposition is influenced only comparatively little or hardly at all by the rocker structure because the rocker structure vibrates about a torsion axis or pivot axis of the spring element and thus there is no bending stress of the coupling element in particular. Consequently, only the interference modes and not the detection modes are shifted toward higher frequencies, so that the frequency interval between the detection mode and interference mode increases and the measurement accuracy of the yaw rate sensor is increased as a whole. This is achieved within the scope of the present invention using comparatively simple and inexpensive means, which are implementable, for example, using standard micromechanical manufacturing methods, preferably for surface micromechanics. The yaw rate sensor includes in particular a micromechanical yaw rate sensor, so that the substrate preferably includes a semiconductor substrate and in particular preferably a silicon substrate.

According to a preferred refinement, it is provided that the rocker structure includes at least one first spring acting on the first Coriolis element and at least one second spring acting on the second Coriolis element, the first and second springs being coupled to one another via a coupling element of the rocker structure. First and second vibrations in phase opposition of the first and second Coriolis elements are thus implementable in an advantageous manner, while at the same time in-phase vibrations of the first and second Coriolis elements perpendicular or parallel to the main plane of extent, for example, are suppressed by the comparatively great bending stiffness of the coupling element.

According to a preferred refinement, it is provided that the coupling element is designed to be less elastic than the first and/or second spring(s) and in particular is designed to be stiff, the first and second springs including flexural springs in particular. The interference modes are advantageously shifted to higher frequencies by the stiffness of the coupling element, so that an enlarged frequency interval between the interference modes and the detection modes is obtained in comparison with the related art. The flexural springs are advantageously designed as U springs.

According to a preferred refinement it is provided that the spring element includes a torsion spring, so that one torsion axis of the torsion spring is preferably aligned parallel to a main plane of extent of the substrate and in particular preferably parallel or perpendicular to the first and second vibrations. The coupling element is designed to be able to vibrate about the torsion axis in an advantageous manner, so that a rotational vibration of the coupling element, in particular in-phase with the up-and-down movements, in phase opposition of the first and second Coriolis elements perpendicularly to the main plane of extent, is made possible and thus the detection mode is affected only slightly or not at all. The influence of the rocker structure on the frequency of the detection mode is preferably adjustable in a targeted manner through the spring stiffness of the torsional springs. Alternatively, a detection vibration of the first and second Coriolis elements parallel and antiparallel to first or second directions X, Y, i.e., parallel to the main plane of extent, is also conceivable, if the yaw rate is oriented in parallel to the main plane of extent and the first and second vibrations are excited in parallel and antiparallel to second or first directions Y, X.

According to a preferred refinement, it is provided that the spring element includes a flexural spring, so that the rocker structure is pivotable via the flexural spring about a pivot axis, which is essentially perpendicular to the main plane of extent. The pivot axis preferably runs parallel or perpendicular to the first and second vibrations.

According to a preferred refinement, it is provided that the spring element is connected to the substrate via anchoring elements, so that each anchoring element preferably includes two partial anchoring elements, which are joined together by a spring coupling, the spring element being attached to the spring coupling, and the spring coupling in particular preferably being oriented perpendicularly to the torsion axis or pivot axis.

According to a preferred refinement, it is provided that the first spring and the second spring is more elastic in parallel to the first and second vibration than perpendicularly to the first and second vibration. The first and second vibrations are facilitated in an advantageous manner, while the occurrence of additional interference modes is suppressed. Furthermore, it is conceivable that the first and second vibrations are perpendicular or parallel to the main extent of the coupling element, so that the sensor design is adaptable in particular to specific installation space requirements.

According to a preferred refinement, it is provided that an additional first spring is situated between the first Coriolis element and the coupling element and/or an additional second spring is situated between the second Coriolis element and the coupling element. The particular spring and the additional spring are in particular situated parallel to one another, so that additional interference modes due to vibration of the first and/or second Coriolis element(s), in particular parallel to the main plane of extent and perpendicular to the first and/or second directions, are easily suppressed.

According to a preferred refinement, it is provided that the first Coriolis element is attached to a first drive frame via first drive springs, and the second Coriolis element is attached to a second drive frame via second drive springs, the first drive means being provided for driving the first drive frame and the second drive means being provided for driving the second drive frame. Thus in particular a rotation of the first Coriolis element, the second Coriolis element and/or the coupling element in the main plane of extent and/or perpendicular thereto is thus optionally prevented.

According to a preferred refinement, it is provided that the first Coriolis element includes a first Coriolis frame connected to the first spring and connected to a first Coriolis detection element via first detection springs, and/or the second Coriolis element includes a second Coriolis spring connected to the second spring and connected to a second Coriolis detection element via second detection springs. The signal-to-noise ratio of the yaw rate sensor is thus increased in an advantageous manner.

According to a preferred refinement, it is provided that the first Coriolis element, the first drive frame and/or the first Coriolis detection element are each attached to the substrate via first mounting springs, and/or the second Coriolis element, the second drive frame and/or the second Coriolis detection element are each attached to the substrate via second mounting springs. This advantageously reduces the influence of an interfering movement which is caused by the first and second drive elements and is superimposed on the detection mode. The first and second mounting springs are preferably designed to be stiff perpendicularly to the main plane of extent, so that the first and second mounting springs advantageously act as hinges for the first and second Coriolis elements. The stiffness ratios in particular are adjusted in such a way that the outer springs (on the side facing away from the rocker structure) preferably allow at most 50% and particularly preferably at most 10% of the deflection of the internal springs (on the side facing away from the rocker structure). Alternatively, it is preferably provided that the first and second mounting springs are designed to be stiff parallel to the second direction. It is provided in particular that the first and second mounting springs, which anchor the first and second drive frames on the substrate, are designed to be stiff, so that the allowed deflections of the first and second drive frame are at most twice as small as the deflections of the rocker structure at the same force along the third direction.

According to a preferred refinement, it is provided that the first and second vibration parallel or antiparallel to the first or second direction takes place in such a way that in the presence of a yaw rate perpendicular to the main plane of extent, a first and a second Coriolis force act parallel to the second or first direction Y, X, i.e., perpendicularly to third direction Z, and a deflection of the first and second Coriolis elements parallel or antiparallel to the second or first direction Y, X is thus detectable.

According to a preferred refinement, it is provided that the first drive frame and the second drive frame are coupled to one another via a deflecting frame, the deflecting frame including a plurality of deflecting frame part elements, which are connected to one another via spring units in such a way that a vibration in phase opposition of the first and second drive frames parallel to the first and second vibrations produces a deformation of the deflecting frame in a plane parallel to the main plane of extent. In an advantageous manner, a degeneration between a parallel driving vibration (interference mode) and an antiparallel driving vibration (useful mode) is canceled by such a coupling between the first and the second drive frames.

According to a preferred refinement, it is provided that the first drive frame is coupled to a first frame part via a first spring unit, and the second drive frame is coupled to a second frame part via a second spring unit, so that the first and second frame parts are coupled to one another via additional first and additional second spring units to form a deflecting frame running peripherally around the first and second drive frames, and the first and second frame parts each include two L-shaped L elements, each of which is coupled to the substrate in a corner area. The interference mode is advantageously suppressed by the deflecting frame, while the drive mode is influenced only insignificantly or not at all, thereby further increasing the interval between the frequency of the interference mode and the frequency of the drive mode. This is achieved by shearing of the spring connections between those four L-shaped L elements in the interference mode.

Exemplary embodiments of the present invention are illustrated in the drawings and explained in greater detail in the following description.

BRIEF DESCRIPTION OF THE DRAWINGS

FIGS. 9 and 10a through 10d show schematic views of a yaw rate sensor according to a seventh specific embodiment of the present invention.

DETAILED DESCRIPTION OF THE INVENTION

Figure 1:
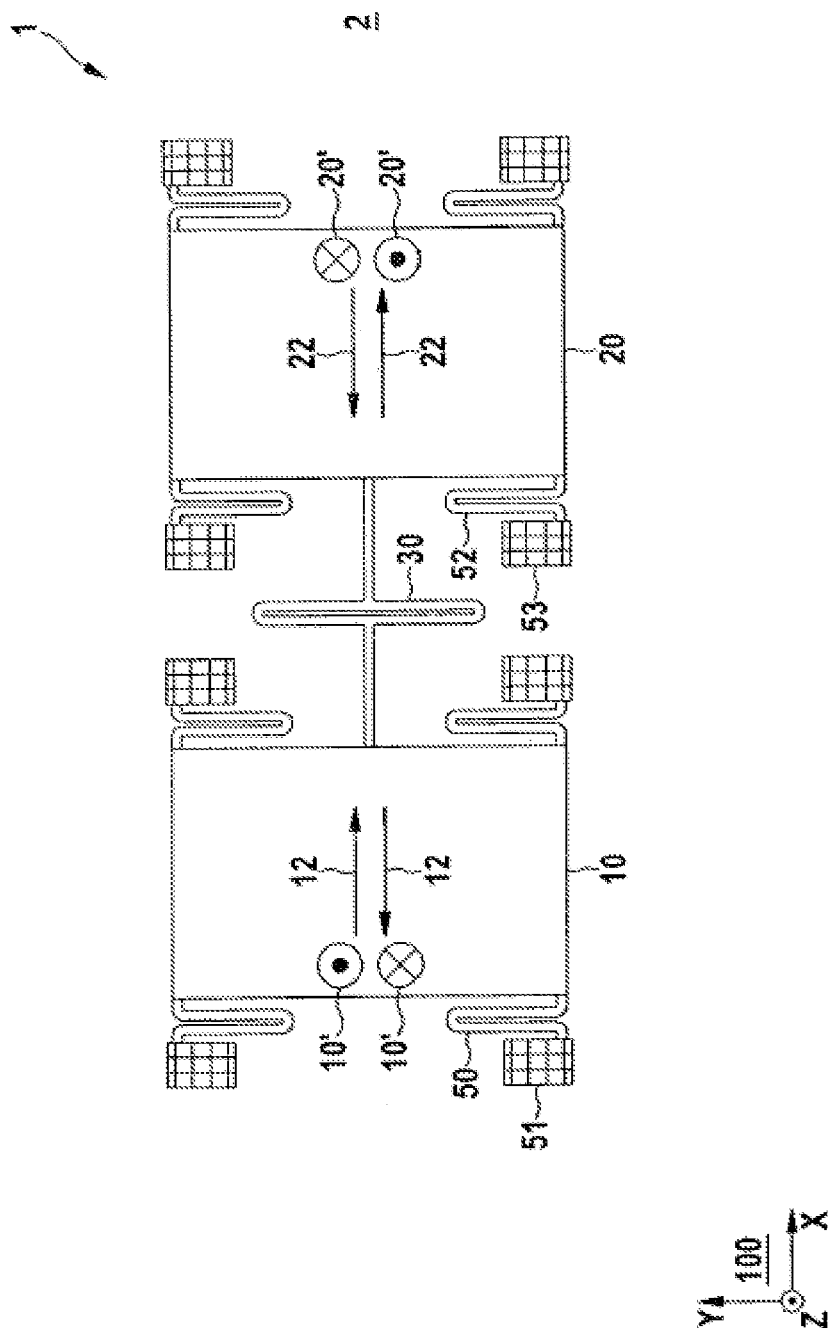
FIGS. 1 and 2 show schematic top views of two yaw rate sensors according to the related art.

The same parts in the various figures are always labeled with the same reference numerals and therefore are usually mentioned or discussed only once.

Figure 2:
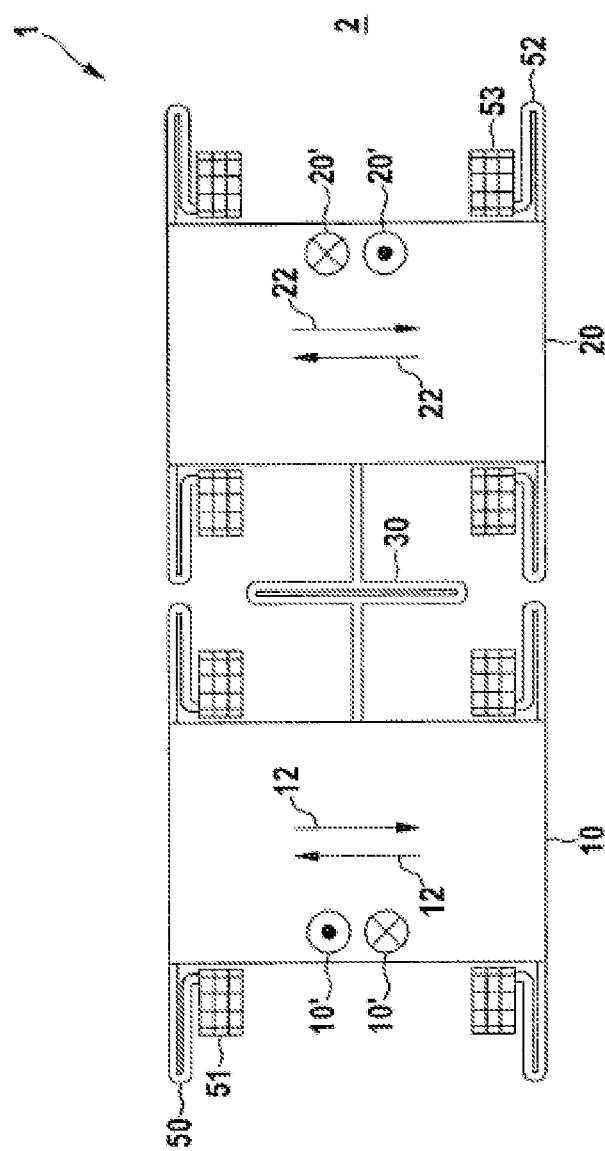

FIGS. 1 and 2 show schematic top views of two yaw rate sensors 1 according to the related art. Yaw rate sensor 1 illustrated in FIG. 1 has a substrate 2, a first Coriolis element 10 and a second Coriolis element 20, which extend essentially parallel to a main plane of extent 100 of substrate 2 and are designed to be movable with respect to substrate 2. For this purpose, first Coriolis element 10 is suspended by elastic first suspension springs 50 on first anchoring units 51 of substrate 2, and second Coriolis element 20 is suspended by second elastic suspension springs 52 on second anchoring units 53. First Coriolis element 10 is excitable by first excitation means to a first vibration 12 parallel to main plane of extent 100 and parallel to a first direction X (not shown), while second Coriolis element 20 is excitable by second excitation means (not shown) to a second vibration 22 antiparallel to first vibration 12. The first and second excitation means include, for example, a capacitive comb drive. First and second Coriolis elements 10, 20 are connected to one another by a spring structure 30, including a flexural spring structure according to the related art. In the presence of a yaw rate about an axis of rotation parallel to a second direction Y, a first Coriolis force 10' acts on first Coriolis element 10, and a second Coriolis force 20' acts on second Coriolis element 20. First and second Coriolis forces 10', 20' each act perpendicularly to main plane of extent 100, i.e., parallel to a third direction Z and antiparallel to one another. One Coriolis element 10, 20 is thus lifted in relation to substrate 2, for example, while the other Coriolis element 20, 10 is lowered in relation to substrate 2. These changes in distance are a measure of yaw rate and are measured and evaluated differentially by first and second detection means (not shown). The first and second detection means preferably include flat electrodes situated perpendicularly to main plane of extent 100 between first and second Coriolis elements 10, 20 and substrate 2. First and second suspension springs 50, 52 preferably include flexural springs, which are designed to be more elastic parallel to first direction X than parallel to second direction Y. FIG. 2 illustrates an almost identical yaw rate sensor 1, first and second vibrations 12, 22 running parallel to second direction Y, so that yaw rates having an axis of rotation parallel to first direction X are detectable. First and second suspension springs 50, 52 are designed to be more elastic parallel to second direction Y than parallel to first direction Y.

Figure 3:
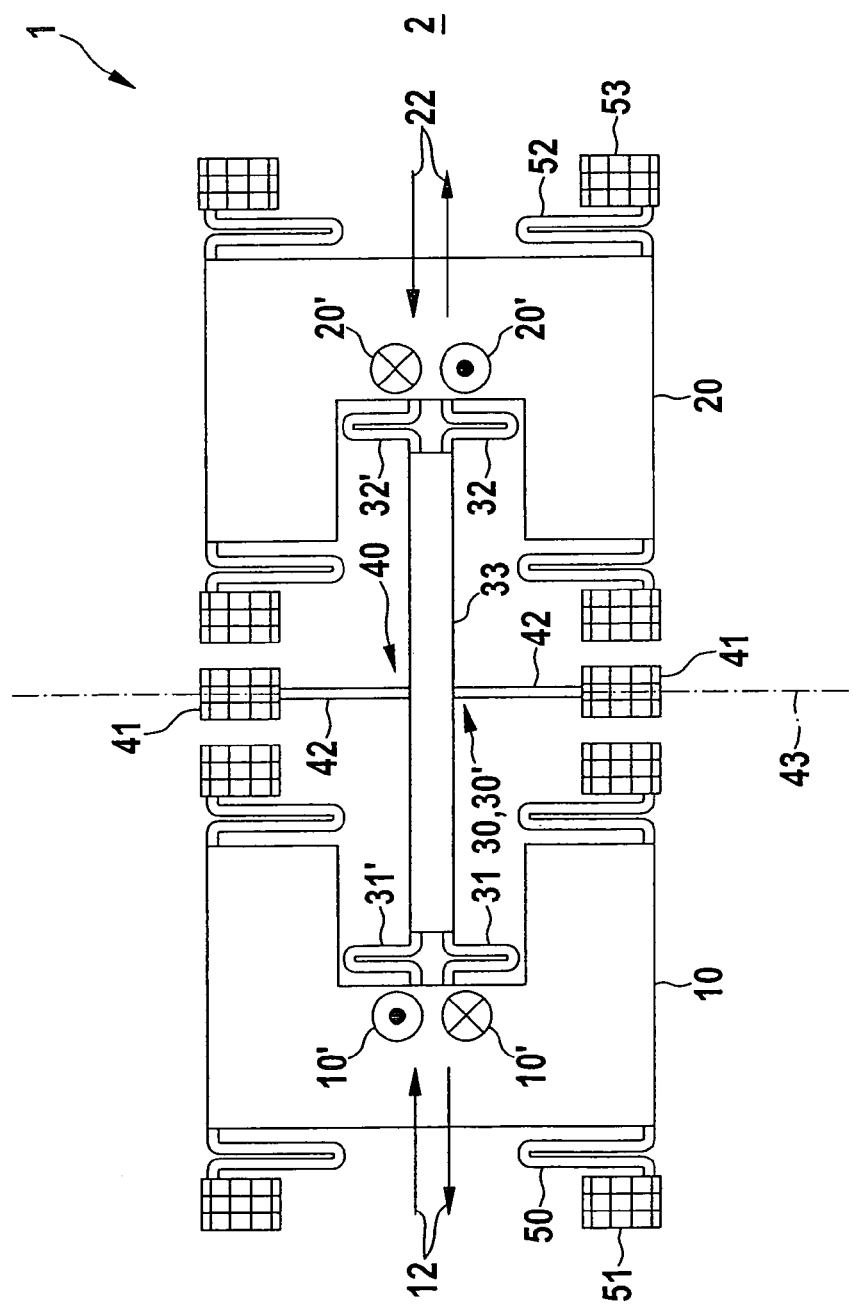
FIG. 3 shows a schematic top view of a yaw rate sensor according to a first specific embodiment of the present invention.

FIG. 3 shows a schematic top view of a yaw rate sensor 1 according to a first specific embodiment of the present invention, the first specific embodiment of the present invention essentially resembling yaw rate sensor 1 illustrated in FIG. 1, where spring structure 30 includes a rocker structure 30'. Rocker structure 30' includes a coupling element 33 extending between first and second Coriolis elements 10, 20 parallel to first direction X. A first end of coupling element 33 is elastically connected by a first spring 31 and an additional first spring 31' to first Coriolis element 10, while the opposite second end of coupling element 33 is elastically connected by a second spring 32 and an additional second spring 32' to second Coriolis element 20. First spring, additional first spring, second spring and additional second spring 31, 31', 32, 32' are designed to be more elastic parallel to first direction X than parallel to second direction Y. Furthermore, coupling element 33 is designed to be stiff at least in comparison with springs 31, 31', 32, 32'. Coupling element 33 is also connected to substrate 2 by an additional spring structure 40, additional spring structure 40 including two spring elements 42 designed as torsion springs, each acting on coupling element 33 and on an anchoring element 41. Spring elements 42 extend parallel to second direction Y and thus allow a rotational vibration of coupling element 33 about a torsion axis 43 parallel to second direction Y. A deflection in phase opposition of first and second Coriolis elements 10, 20 parallel and antiparallel to third direction Z (also referred to as the detection mode) based on first and second Coriolis forces 10', 20' then generates a rotational movement and a rocking movement of coupling element 33 about torsion axis 43, while in-phase deflection of first and second Coriolis elements 10, 20 (also referred to as the interference mode) is suppressed by the bending stiffness of rocker structure 30'.

Figure 4:
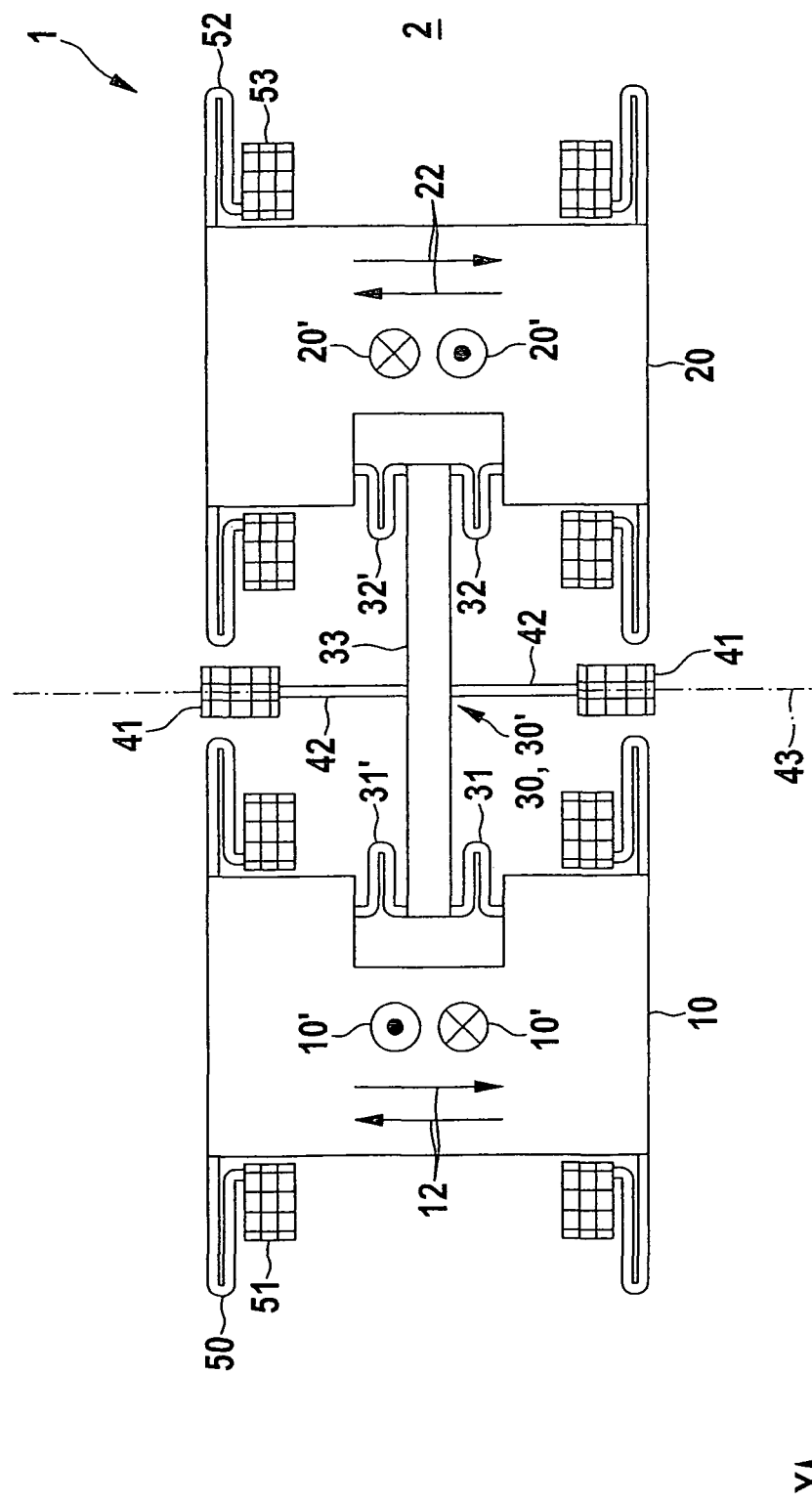
FIG. 4 shows a schematic top view of a yaw rate sensor according to a second specific embodiment of the present invention.

FIG. 4 shows a schematic top view of a yaw rate sensor 1 according to a second specific embodiment of the present invention, the second specific embodiment essentially resembling the first specific embodiment illustrated in FIG. 3, but in contrast (as in FIG. 2), first and second suspension springs 50 and first spring, additional first spring, second spring and additional second spring 31, 31', 32, 32' are designed to be more elastic parallel to second direction Y than parallel to first direction Y, so that detection of a yaw rate parallel to first direction X is made possible.

Figure 5:
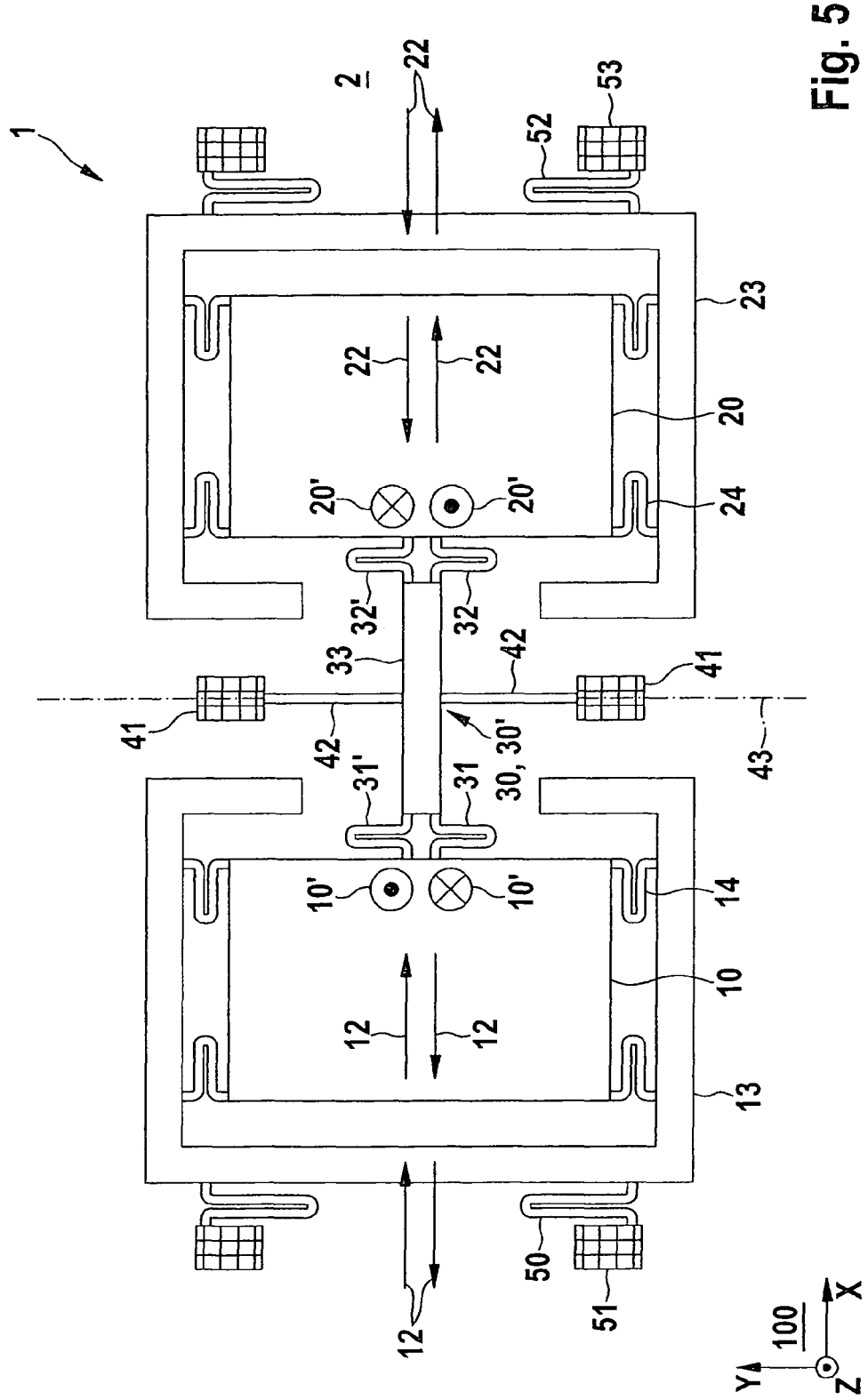
FIG. 5 shows a schematic top view of a yaw rate sensor according to a third specific embodiment of the present invention.

FIG. 5 shows a schematic top view of a yaw rate sensor 1 according to a third specific embodiment of the present invention, the third specific embodiment essentially resembling the first specific embodiment shown in FIG. 3, where first Coriolis element 10 is integrated into a first drive frame 13 and second Coriolis element 20 is integrated into a second drive frame 23. First suspension springs 50 here act on first drive frame 13, which is connected by first drive springs 14 to first Coriolis element 10. Similarly, second suspension springs 55 act on second drive frame 23, which is connected by second drive springs 24 to second Coriolis element 20. First and second drive springs 14, 24 are designed to be more elastic parallel to second direction Y than parallel to first direction X, so that a driving force acting parallel to first direction X is transferable from first and second drive frame(s) 13, 23 to first and second Coriolis elements 10, 20.

Figure 6:
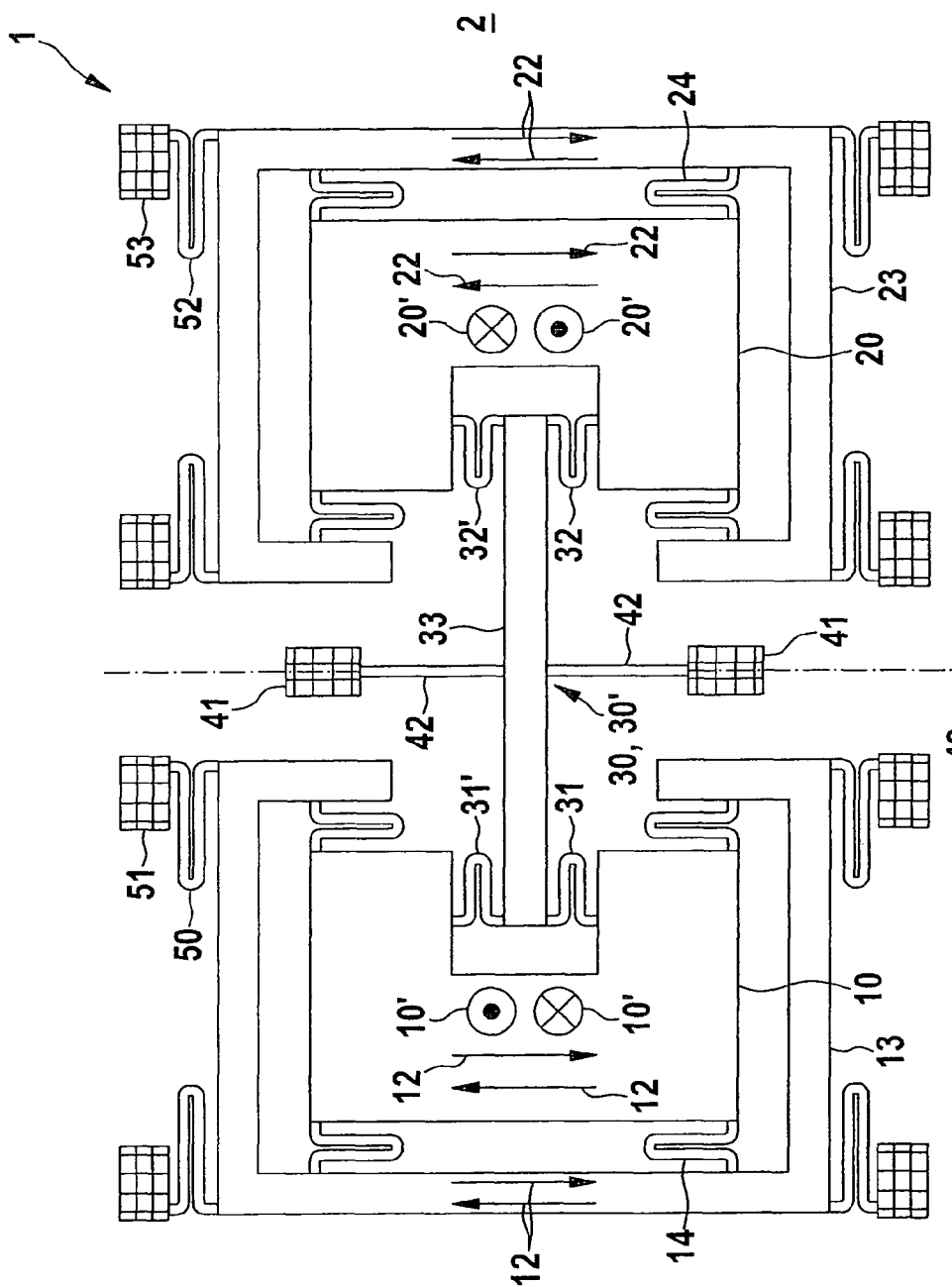
FIG. 6 shows a schematic top view of a yaw rate sensor according to a fourth specific embodiment of the present invention.

FIG. 6 shows a schematic top view of a yaw rate sensor 1 according to a fourth specific embodiment of the present invention, the fourth specific embodiment essentially resembling the third specific embodiment illustrated in FIG. 5, but in contrast (as in FIG. 4), first and second suspension springs 50 and first spring, additional first spring, second spring and additional second spring 31, 31', 32, 32' are designed to be more elastic parallel to second direction Y than parallel to first direction X, so that it is possible to detect a yaw rate parallel to first direction X. In addition, first and second drive springs 14, 24 are now designed to be more elastic parallel to first direction X than parallel to second direction Y, so that first and second vibrations parallel to second direction Y may be driven by first and second drive frames 13, 23.

Figure 7:
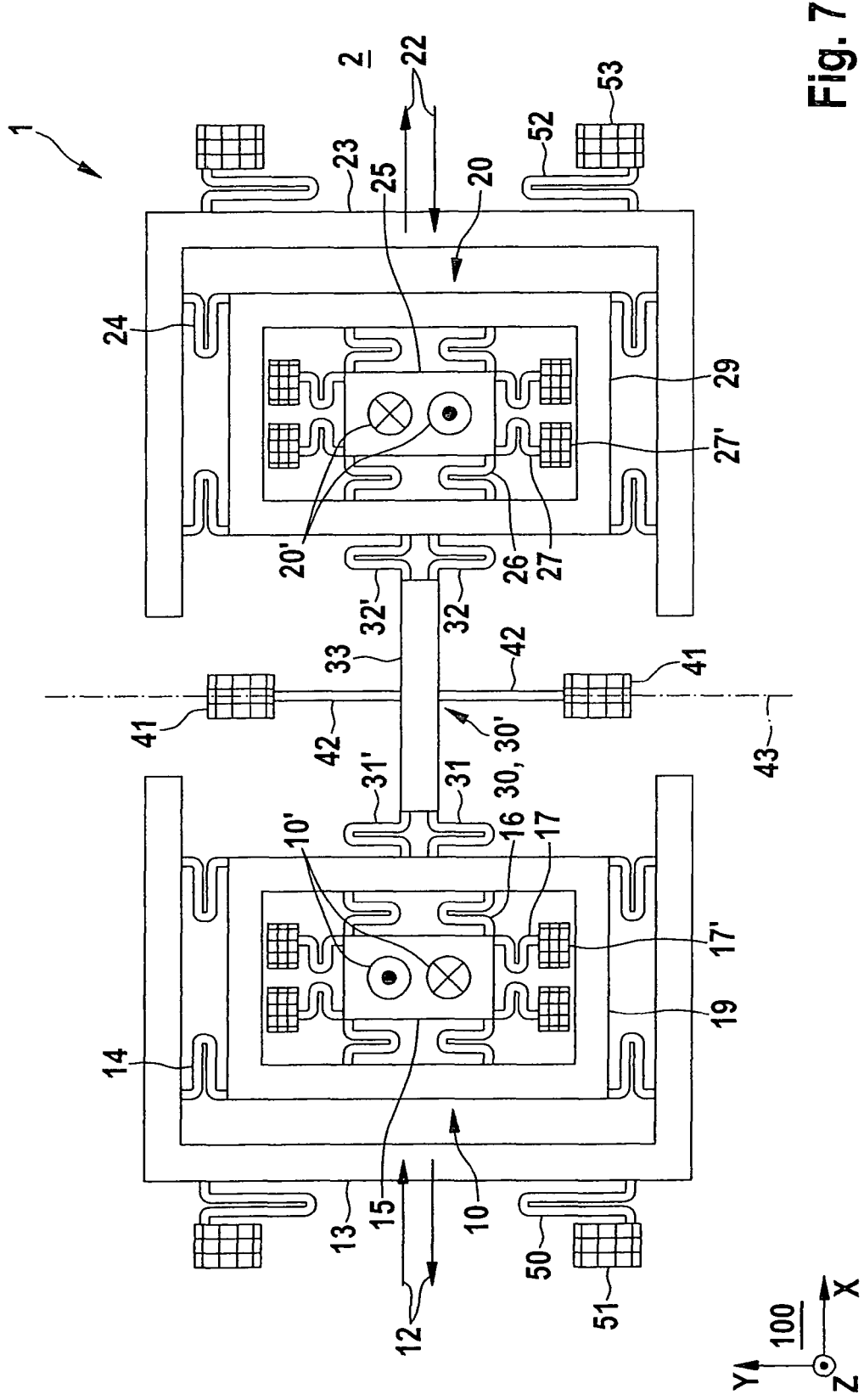
FIG. 7 shows a schematic top view of a yaw rate sensor according to a fifth specific embodiment of the present invention.

FIG. 7 shows a schematic top view of a yaw rate sensor 1 according to a fifth specific embodiment of the present invention, the fifth specific embodiment essentially resembling the third specific embodiment shown in FIG. 5, first Coriolis element 10 including a first Coriolis frame 19 and a first Coriolis detection element 15 situated parallel to main plane of extent 100 within first Coriolis frame 19, first Coriolis detection element 15 being elastically connected by first detection springs 16 to Coriolis frame 19. First spring 31 and additional first spring 31' act directly on Coriolis frame 14 (alternatively, it is conceivable for Coriolis frame 19 to be opened and for first spring and additional first spring 31, 31' to act directly on Coriolis detection element 15). First detection springs 16 are designed to be more elastic parallel to first direction X than parallel to second direction Y. In addition, Coriolis detection element 15 is attached to substrate 2 by first mounting springs 17 having additional anchoring units 17', first mounting springs 17 being designed to be more elastic parallel to second direction Y than parallel to first direction X. Second Coriolis element 20 has a similar design and includes a second Coriolis detection element 25, which is enclosed by second detection springs 26 in a second Coriolis frame 29 and is attached to substrate 2 by second mounting springs 27 on second anchoring units 27'.

Figure 8:
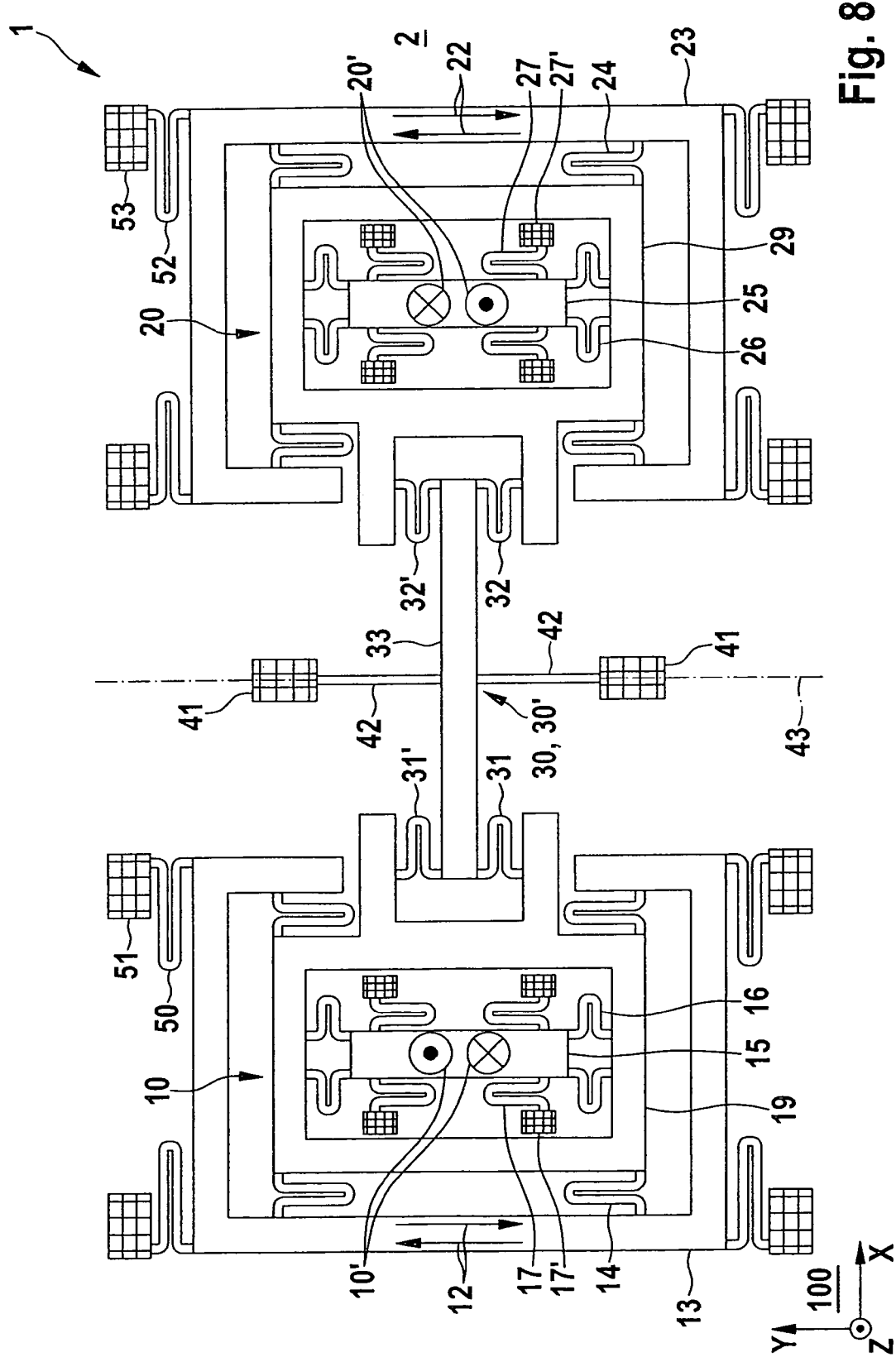
FIG. 8 shows a schematic top view of a yaw rate sensor according to a sixth specific embodiment of the present invention.

FIG. 8 shows a schematic top view of a yaw rate sensor 1 according to a sixth specific embodiment of the present invention, the sixth specific embodiment essentially resembling the fifth specific embodiment illustrated in FIG. 7, but in contrast (as in FIG. 6), first and second suspension springs 50 and first spring, additional first spring, second spring and additional second spring 31, 31', 32, 32' are designed to be more elastic parallel to second direction Y than parallel to first direction Y, so that detection of a yaw rate parallel to first direction X is made possible. Furthermore, first and second drive springs 14, 24 are designed to be more elastic parallel to first direction X than parallel to second direction Y, so that first and second vibrations parallel to second direction Y may be driven by first and second drive frames 13, 23. In addition, first and second detection springs 16, 26 are now designed to be more elastic parallel to second direction Y than parallel to first direction X, while first and second mounting springs 17, 27 are designed to be more elastic parallel to first direction X than parallel to second direction Y.

FIGS. 9 and 10a through 10d show schematic views of a yaw rate sensor 1 according to a seventh specific embodiment of the present invention, the seventh specific embodiment essentially resembling the third specific embodiment shown in FIG. 5, the yaw rates to be measured not being aligned parallel to second direction Y but parallel to third direction Z, i.e., aligned perpendicularly to main plane of extent 100. Spring element 42 thus includes a flexural spring, which allows a pivoting movement of rocker structure 30' about a pivot axis 44 perpendicular to main plane of extent 100. First and second vibrations 12, 22 again run parallel and antiparallel to first direction X, while first and second Coriolis forces 10', 20' now act on first and second Coriolis elements 10, 20 along second direction Y. First and second Coriolis elements 10, 20 are therefore in phase opposition to one another and are deflected in parallel to second direction Y, so that the first and second detection means are designed as electrode structures 300, which are integrated into first and second Coriolis elements 10, 20 and are designed for detection of deflections along second direction Y of first and second Coriolis elements 10, 20 relative to substrate 2. Rocker structure 30' thus does not rock about torsion axis 43 illustrated in FIG. 5, but instead about a pivot axis 44 running centrally through rocker structure 30' and perpendicularly to main plane of extent 100. First and second (driving) vibrations 12, 22 are illustrated schematically without the presence of the yaw rate for the sake of clarity in FIGS. 10a and 10b, whereas in FIGS. 10c and 10d, the first and second deflections of first and second Coriolis elements 10, 20 are illustrated as being parallel and antiparallel to the second axis because of first and second Coriolis forces 10', 20' in the presence of a yaw rate.

FIGS. 11 and 12a through 12d show schematic views of a yaw rate sensor 1 according to an eighth specific embodiment of the present invention, the eighth specific embodiment essentially resembling the seventh specific embodiment shown in FIGS. 9 and 10a through 10d, first and second (driving) vibrations 12, 22 here running parallel and antiparallel to second direction Y, while first and second Coriolis forces 10', 20' act parallel and antiparallel to first direction X. The yaw rate again runs perpendicularly to main plane of extent 100 and parallel to third direction Z. Electrode structures 300 are rotated by 90° in main plane of extent 100 accordingly. First and second (driving) vibrations 12, 22 in the absence of the yaw rate are illustrated schematically in FIGS. 12a and 12b, while first and second deflections of first and second Coriolis elements 10, 20 are illustrated in the presence of a yaw rate in FIGS. 12c and 12d.

Figure 9:
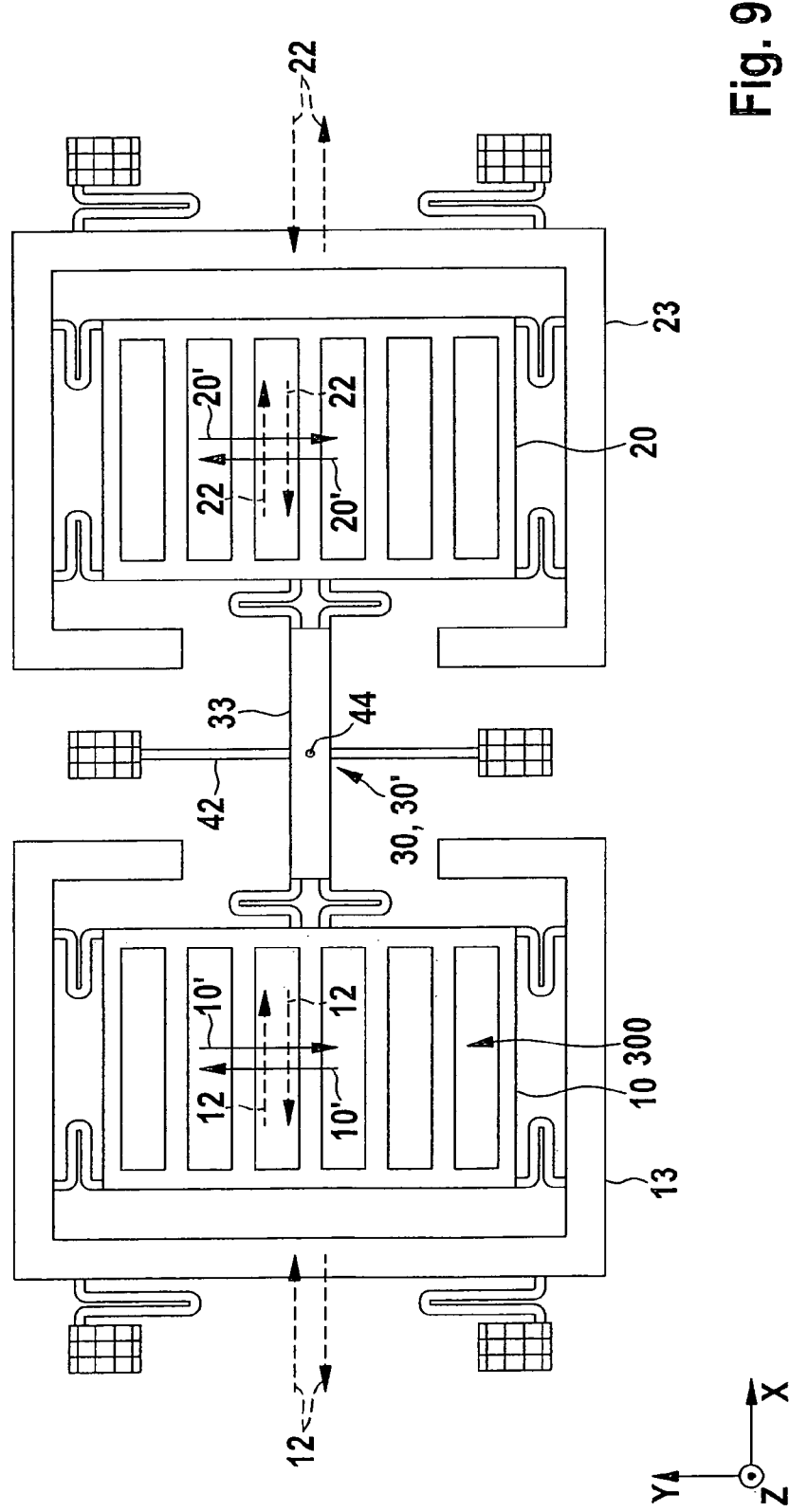
Figure 11:
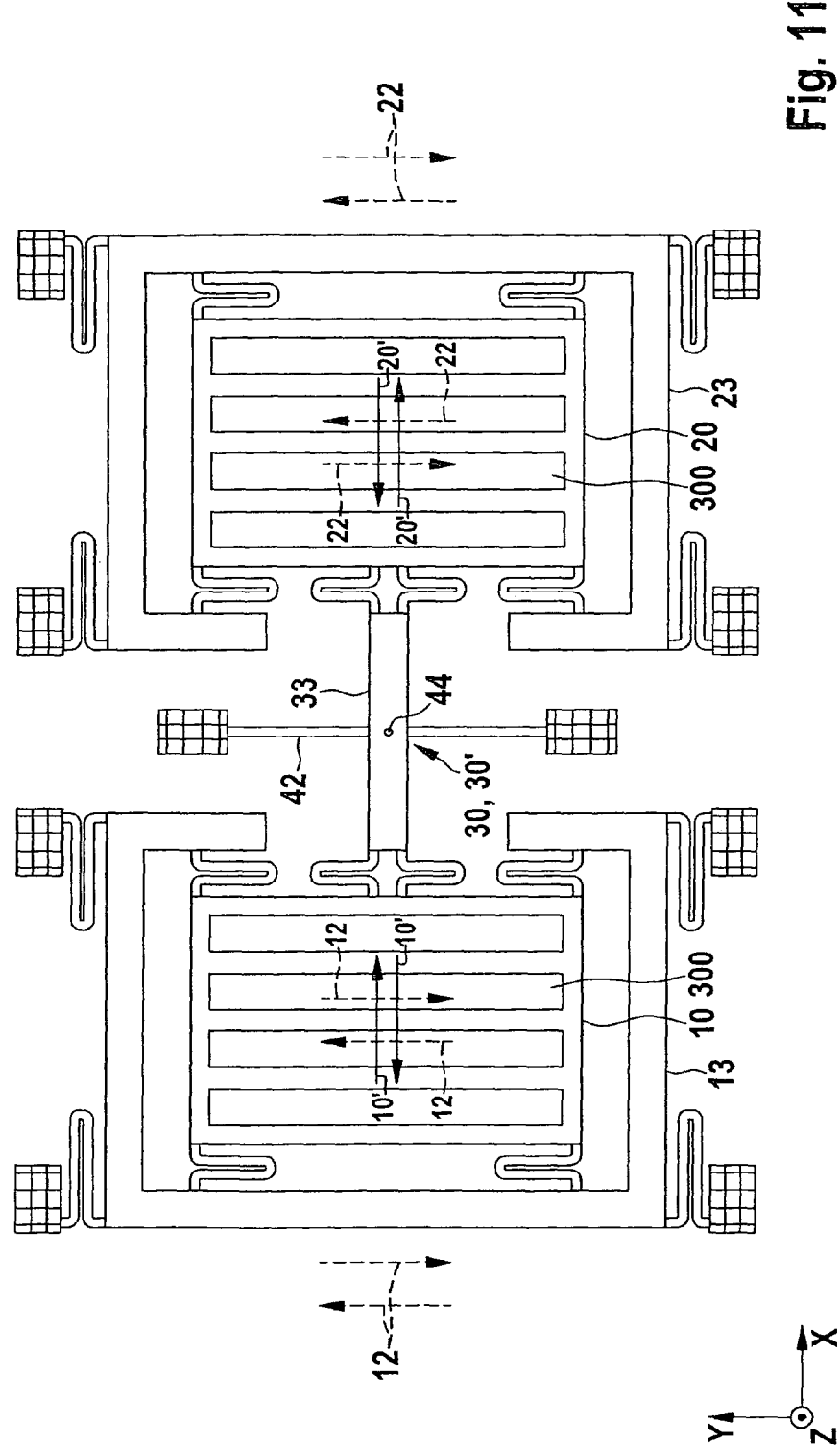
FIGS. 11 and 12a through 12d show schematic views of a yaw rate sensor according to a eighth specific embodiment of the present invention.
Figure 12A:
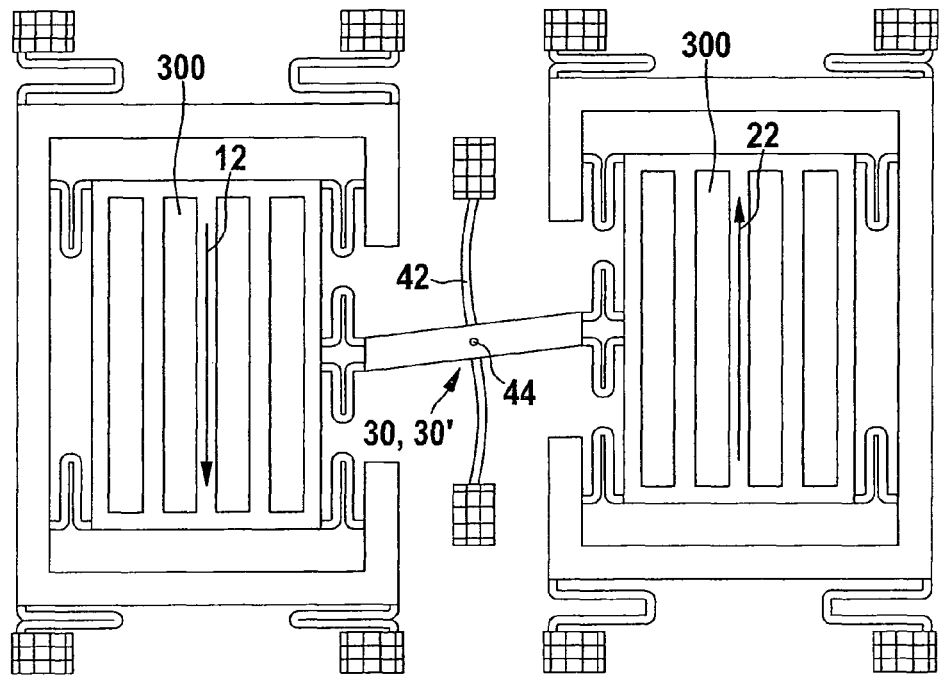
Figure 12B:
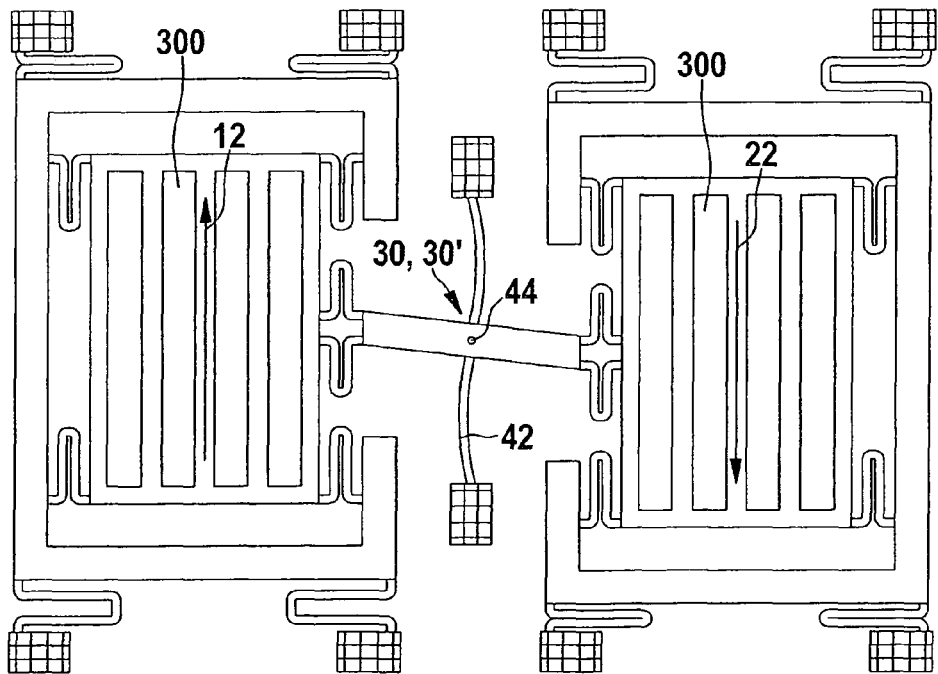
Figure 12C:
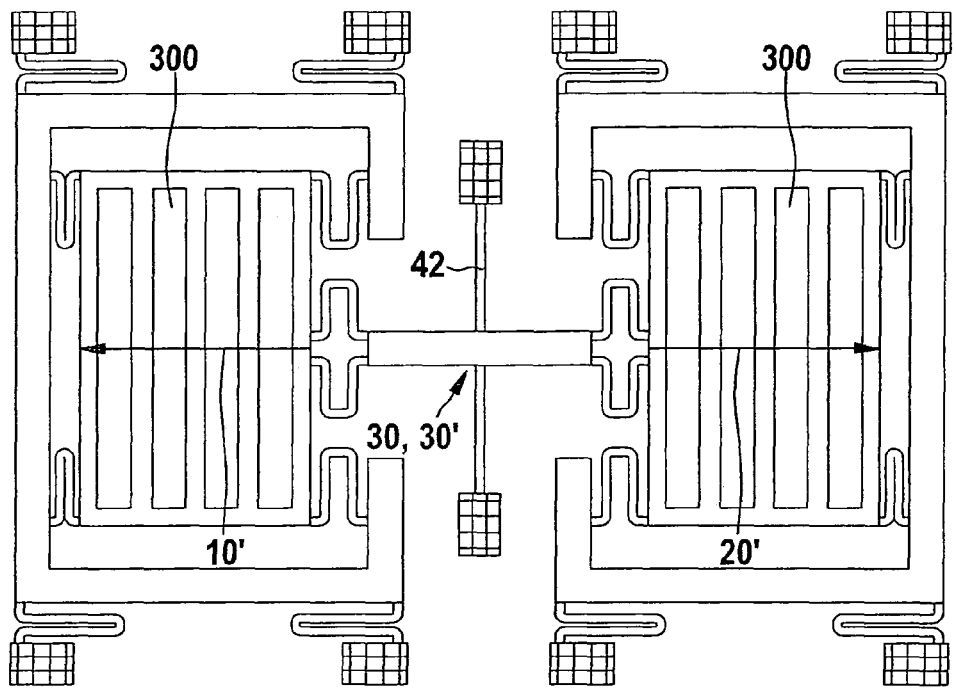
Figure 12D:
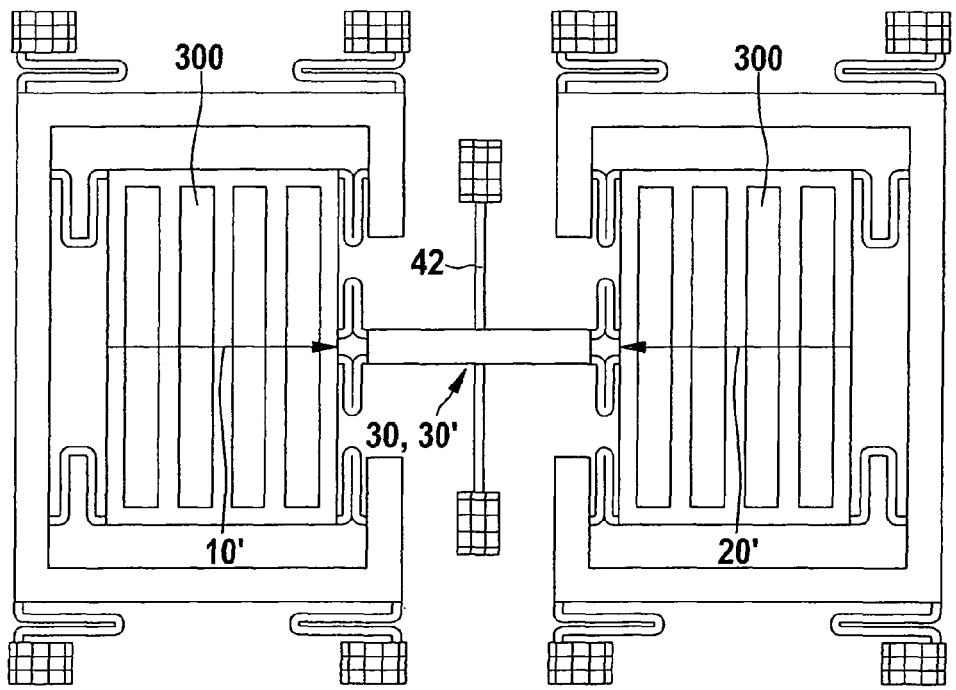
Figure 13:
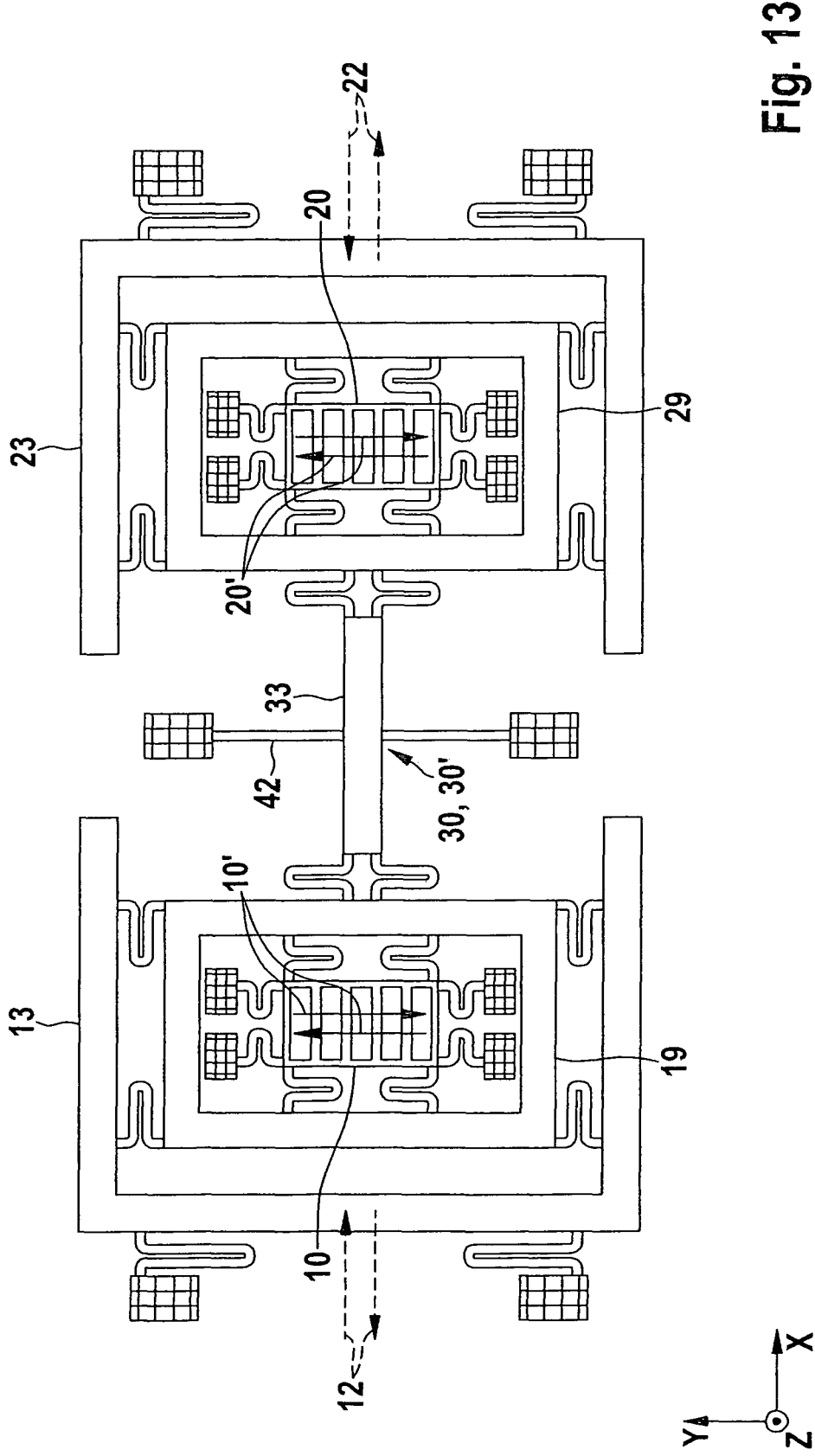
FIG. 13 shows a schematic view of a yaw rate sensor according to a ninth specific embodiment of the present invention.

FIG. 13 shows a schematic view of a yaw rate sensor 1 according to a ninth specific embodiment of the present invention, the ninth specific embodiment essentially resembling the fifth specific embodiment shown in FIG. 7, but as in the seventh specific embodiment, FIG. 9 illustrates first and second vibrations 12, 22 parallel and antiparallel to first direction X, and first and second Coriolis forces 10', 20' are oriented parallel and antiparallel to second direction Y because the yaw rate is aligned perpendicularly to main plane of extent 100.

Figure 14:
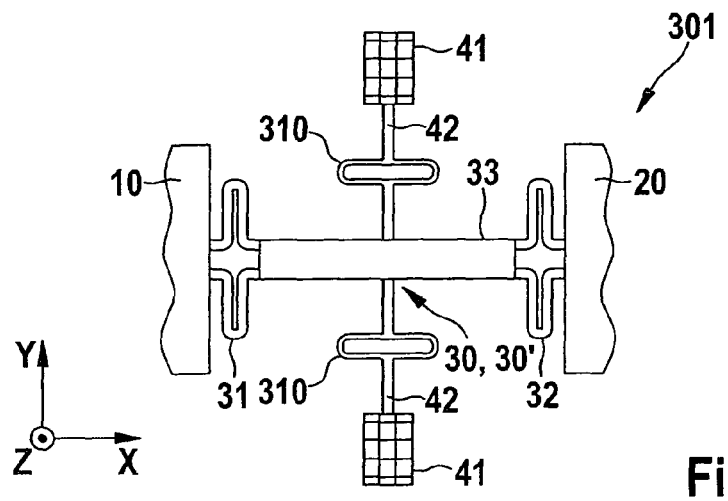
FIG. 14 shows a schematic partial view of a yaw rate sensor according to a tenth specific embodiment of the present invention.
Figure 15:
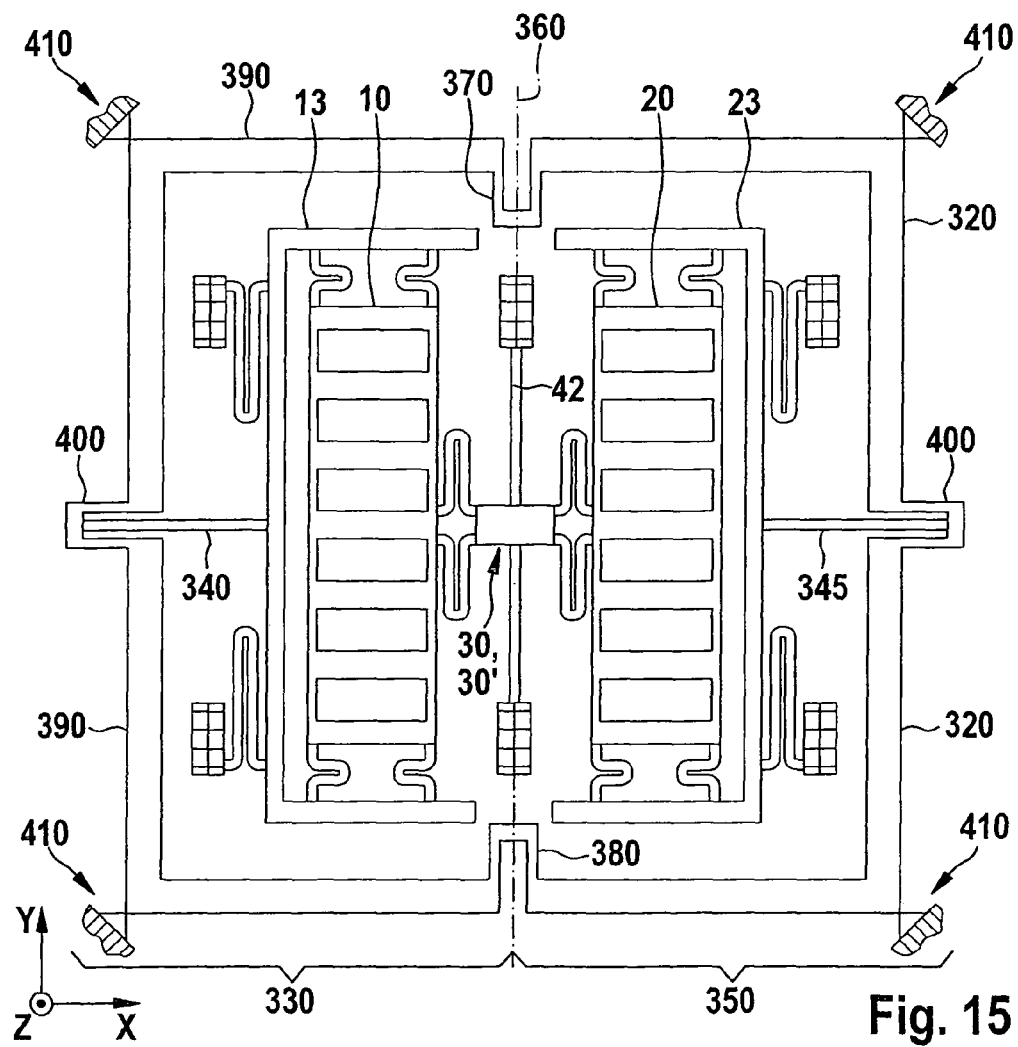
FIGS. 15 and 16a through 16d show schematic views of a yaw rate sensor according to an eleventh specific embodiment of the present invention.

FIG. 14 shows a schematic partial view 301 in the area of rocker structure 30' of a yaw rate sensor 1 according to a tenth specific embodiment of the present invention, the tenth specific embodiment essentially resembling the ninth specific embodiment illustrated in FIG. 13, spring units 42 each having frame-shaped load-relief structures 310, which are embodied as double-U springs in the present example.

Figure 16A:
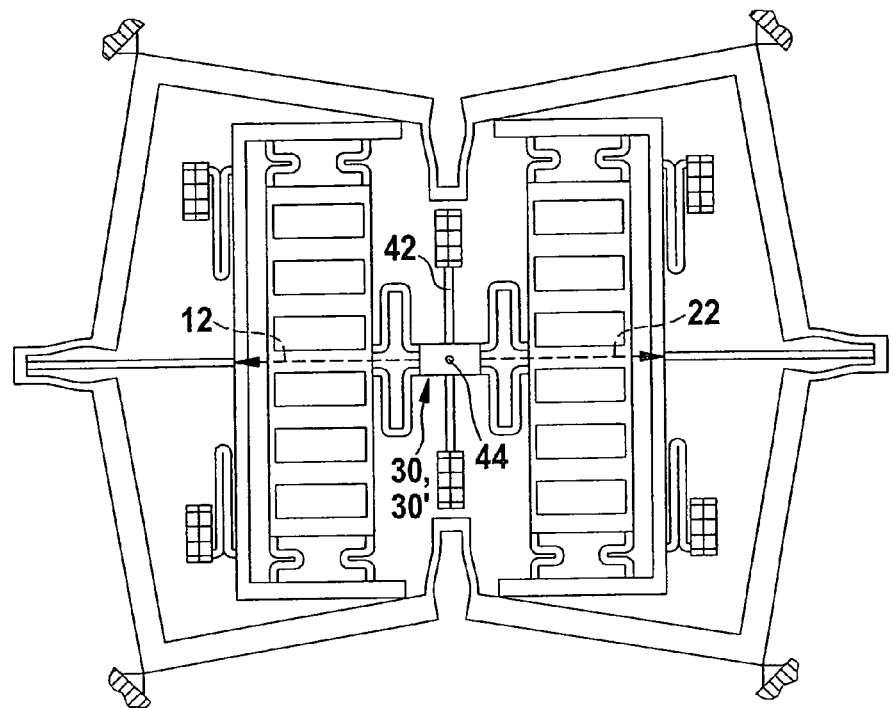
Figure 16B:
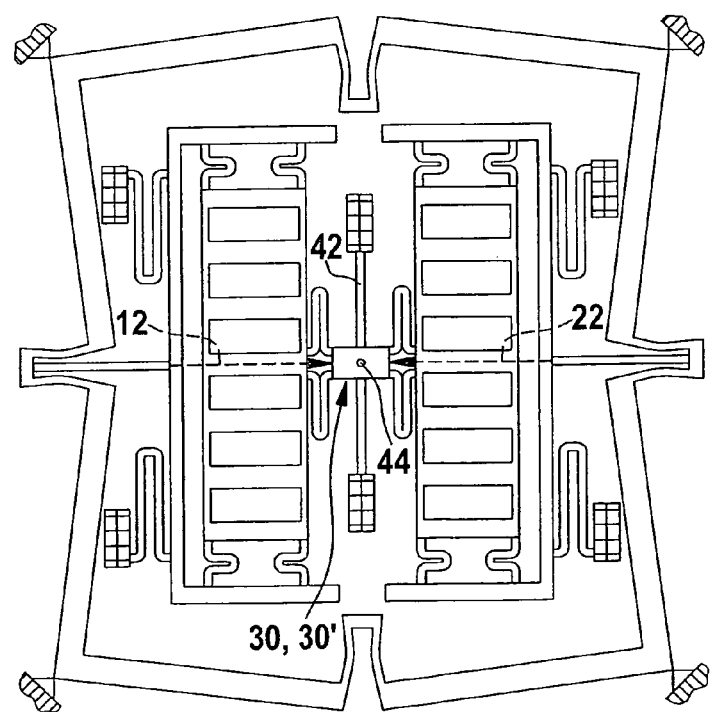
Figure 16C:
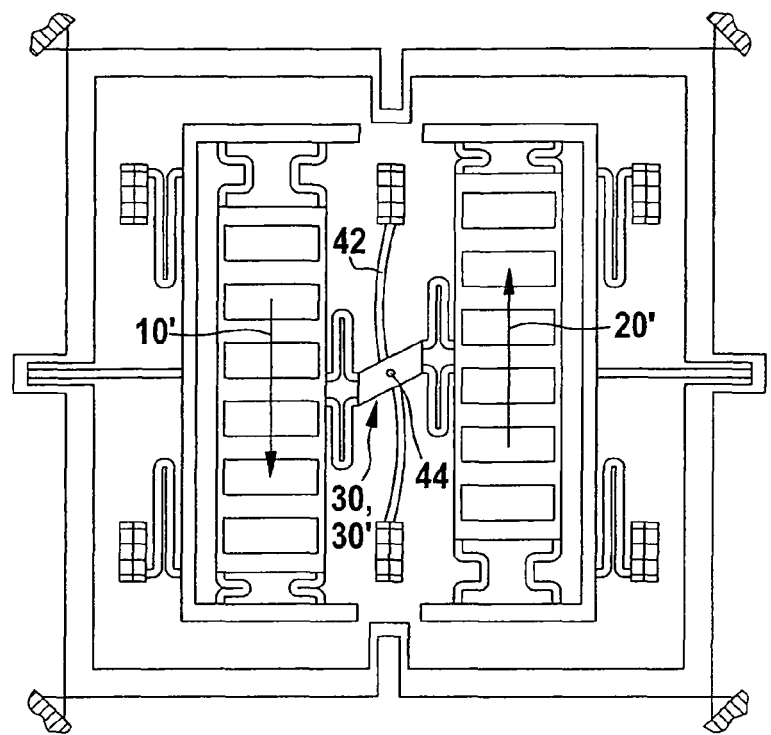
Figure 16D:
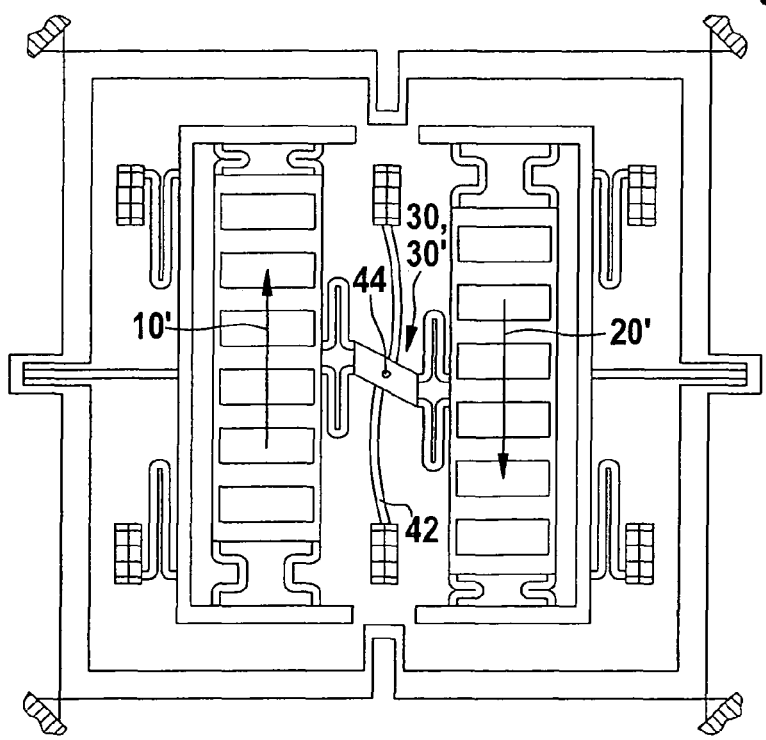

FIGS. 15 and 16a through 16d show schematic views of a yaw rate sensor 1 according to an eleventh specific embodiment of the present invention, the eleventh specific embodiment essentially resembling the seventh specific embodiment illustrated in FIGS. 9 and 10a through 10d, the yaw rate sensor having a deflecting frame 320. Deflecting frame 320 forms an external and completely peripheral frame for yaw rate sensor 1 with respect to main plane of extent 100. Deflecting frame 320 includes first and second frame parts 330, 350, each being C-shaped and designed with mirror symmetry with respect to a plane of symmetry 360 along second and third directions Y, Z, first frame part 330 being coupled by a first spring unit 340 to first drive frame 13, and second frame part 350 being coupled to second drive frame 23 via a second spring unit 345. First and second frame parts 330, 350 are coupled to one another on their particular leg ends via additional first and additional second spring units 370, 380, preferably designed as U springs. In addition, first frame part 330 includes two stiff L elements 390, each being coupled to the other in the area of first and second spring units 340 via third spring units 400, L elements 390 each being connected in a rotationally elastic manner to substrate 2 in their corner areas 410. First and second (driving) vibrations 12, 22 in the absence of the yaw rate are illustrated schematically in FIGS. 16a and 16b, whereas FIGS. 16c and 16d illustrate the first and second deflections of first and second Coriolis elements 10, 20 parallel and antiparallel to the second axis on the basis of first and second Coriolis forces 10', 20' in the presence of a yaw rate. Deflecting frame 320 results in a further increase in the distance between the frequency of the parallel drive mode (interference mode) and the frequency of the antiparallel drive mode, because spring units 400 as well as additional first and additional second units 370, 380 suppress the interference mode, whereas the drive mode is not impaired.

Figure 17:
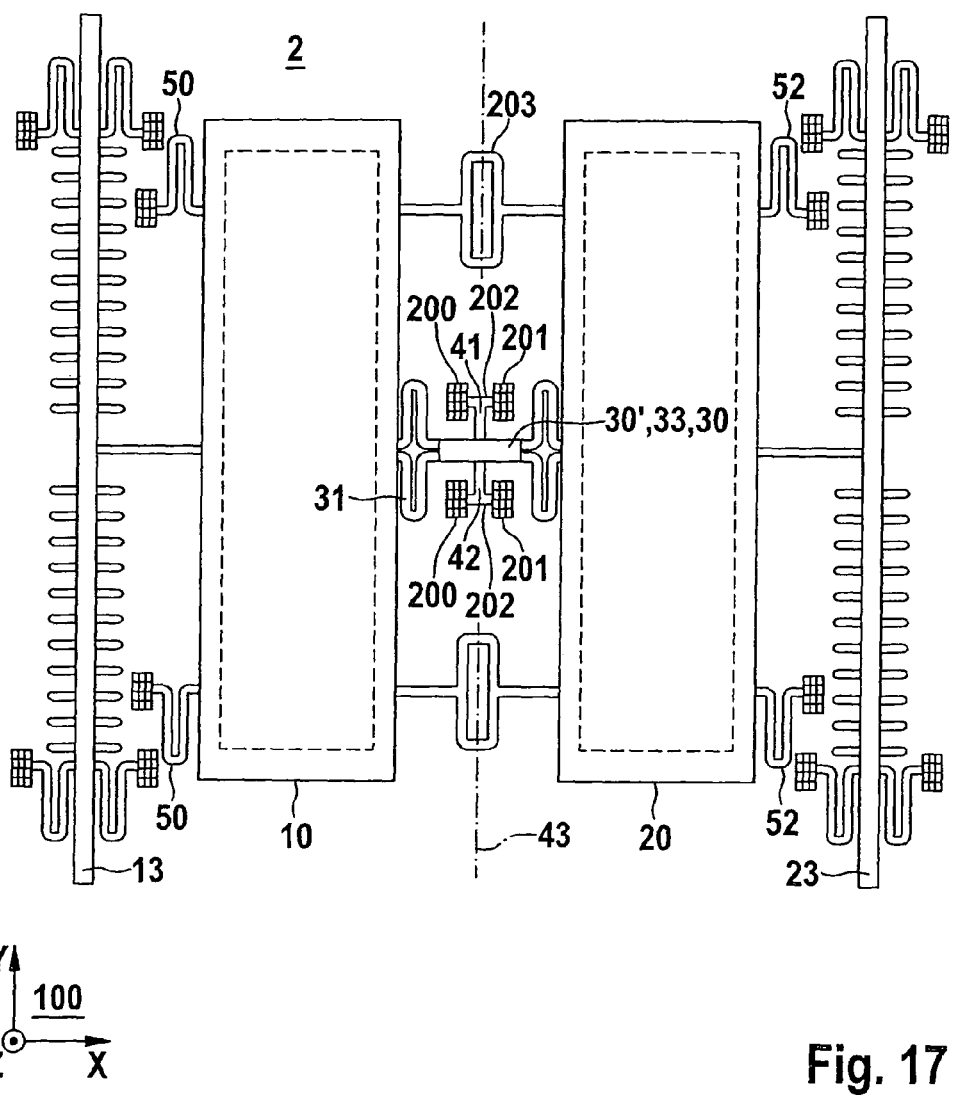
FIG. 17 shows a schematic top view of a yaw rate sensor according to a twelfth specific embodiment of the present invention.

FIG. 17 shows a schematic top view of a yaw rate sensor 1 according to a twelfth specific embodiment of the present invention, the twelfth specific embodiment essentially resembling the third specific embodiment shown in FIG. 5, anchoring elements 41 each including two partial anchoring elements 200, 201 anchored on substrate 2 and connected to one another by a spring coupling 202. Spring elements 42 are each attached to spring coupling 202 centrally between two partial anchoring elements 200, 201. Such a structure functions as a load-relief structure. First and second Coriolis elements 10, are also optionally coupled to one another by additional spring couplings 203 in the form of U springs to cancel a degeneration between a parallel drive mode and an antiparallel drive mode between first and second Coriolis elements 10, 20. First and second Coriolis elements 10, 20 are also attached to substrate 2 via first and second mounting springs 50, 52, first mounting springs 50 being situated on a side of first Coriolis element 10 facing away from rocker structure 30', and second mounting springs 52 being situated on a side of second Coriolis element 20 facing away from rocker structure 30'. First and second mounting springs 50, 52 are designed here as U springs. First and second drive frames 13, 23 are each designed in the form of bars, first and second Coriolis elements 10, 20 being situated along first direction X between first and second drive frames 13, 23 designed as bars. Spring element 42 here includes in particular the torsion spring, which is rotatable about torsion axis 43.

Figure 18:
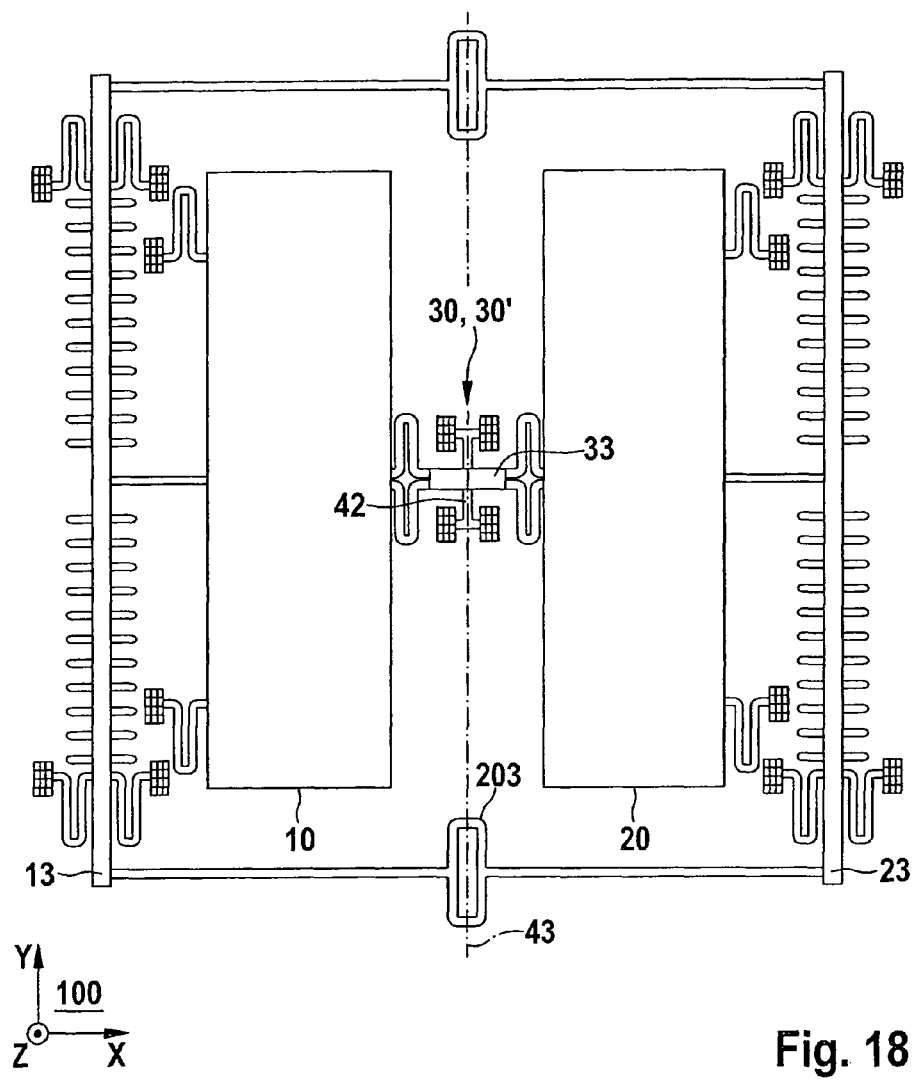
FIG. 18 shows a schematic top view of a yaw rate sensor according to a thirteenth specific embodiment of the present invention

FIG. 18 shows a schematic top view of a yaw rate sensor 1 according to a thirteenth specific embodiment of the present invention, the thirteenth specific embodiment essentially resembling the twelfth specific embodiment shown in FIG. 18, spring couplings 203 not being situated between first and second Coriolis elements 10, 20 but instead extending between first and second drive frames 13, 23 to cancel a degeneration between parallel and antiparallel drive movements between first and second drive frames 13, 23.

Figure 19:
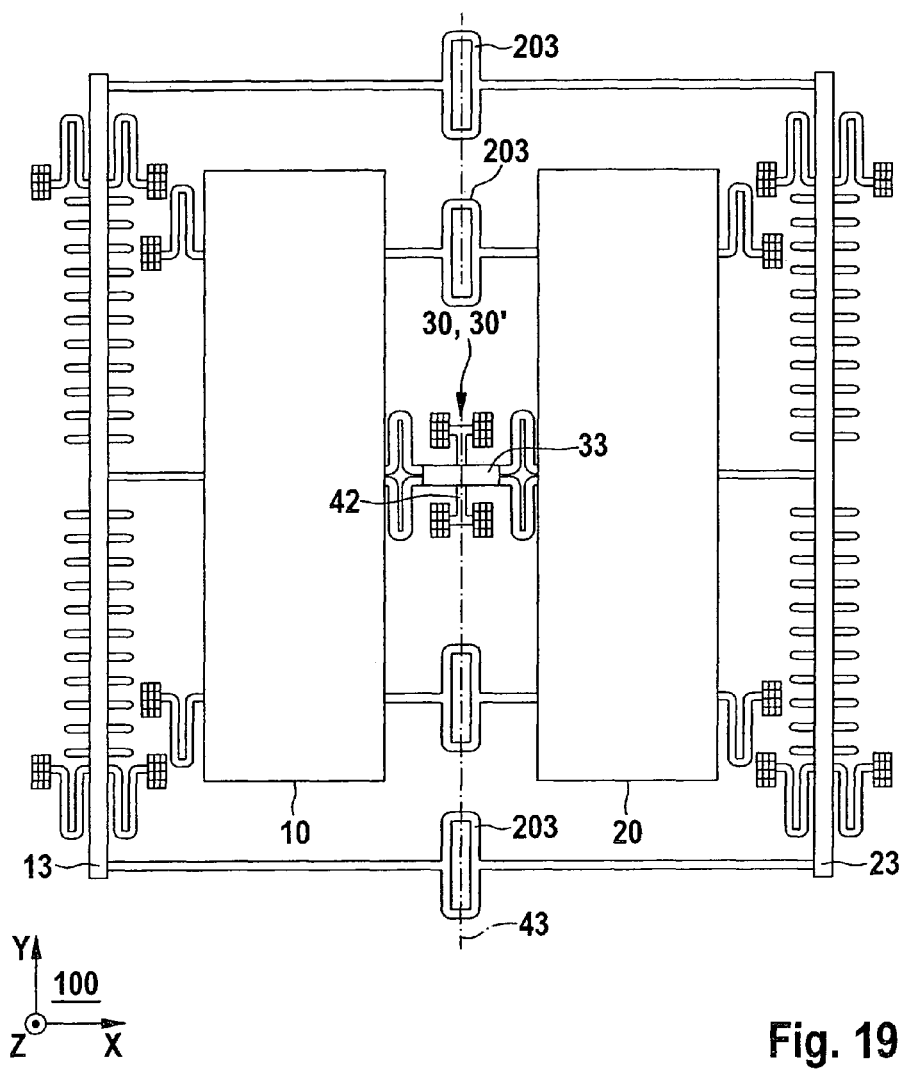
FIG. 19 shows a schematic top view of a yaw rate sensor according to a fourteenth specific embodiment of the present invention.

FIG. 19 shows a schematic top view of a yaw rate sensor 1 according to a fourteenth specific embodiment of the present invention, the fourteenth specific embodiment essentially resembling the twelfth and thirteenth specific embodiments shown in FIGS. 17 and 18, spring couplings 203 extending from first to second Coriolis elements 10, 20 as well as from first to second drive frames 13, 23.

Figure 20:
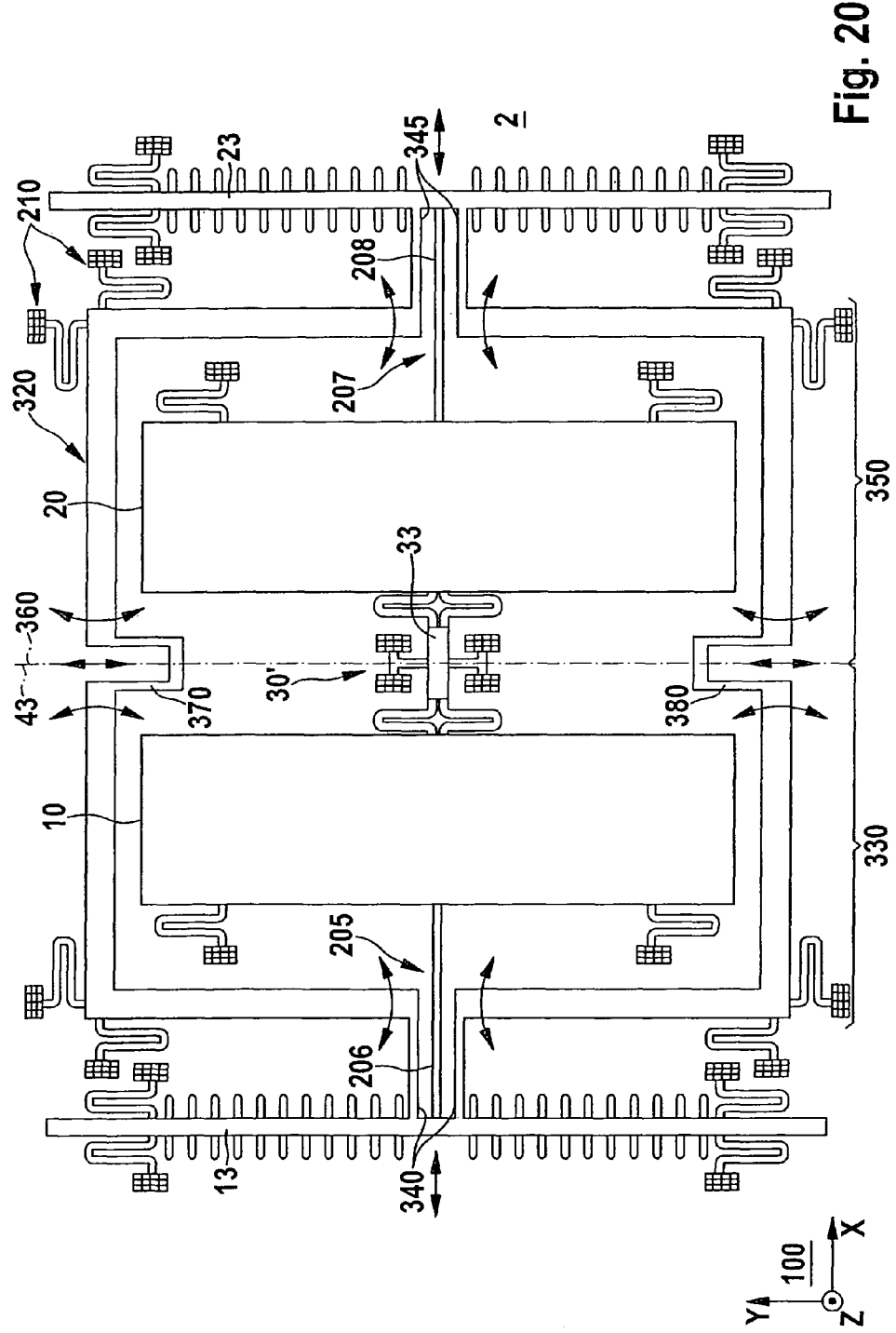
FIG. 20 shows a schematic top view of a yaw rate sensor according to a fifteenth specific embodiment of the present invention.

FIG. 20 shows a schematic top view of a yaw rate sensor 1 according to a fifteenth specific embodiment of the present invention, the fifteenth specific embodiment essentially resembling the twelfth specific embodiment shown in FIG. 17, yaw rate sensor 1 having a deflecting frame 320. Deflecting frame 320 includes first and second frame parts 330, 350, both being C-shaped and designed in mirror symmetry to one another with respect to a plane of symmetry 360 running along second and third directions Y, Z along torsion axis 43, first frame part 330 being coupled to first drive frame 13 via first spring units 340, and second frame 350 being coupled to second drive frame 23 via second spring units 345. First and second frame parts 330, 350 are coupled to one another on their particular leg ends via additional first and additional second spring units 370, 380, preferably designed as U springs. First frame part 330 includes a first opening 205 through which a first connecting bar 206 passes between first Coriolis element 10 and first drive frame 13, while a second frame part 350 includes a second opening 207 through which a second connecting bar 208 runs between second Coriolis element 20 and second drive frame 23. First and second drive frames 13, 23 are thus situated outside of deflecting frame 320, while first and second Coriolis elements 10, 20 are situated within deflecting frame 320 in a plane parallel to main plane of extent 100. Deflecting frame 320 is also attached via anchoring parts 210 in a spring-elastic mount and in particular is rotatably attached to substrate 2. Due to this form of coupling of first and second drive frames 13, 23, a degeneration between parallel drive modes (interference mode) and antiparallel drive modes (useful mode) is canceled. This is achieved in particular by different stiffness values of additional first and additional second spring units 370, 380 with respect to loading in the same direction (bending) and loading in the opposite direction (shearing).

Figure 21:
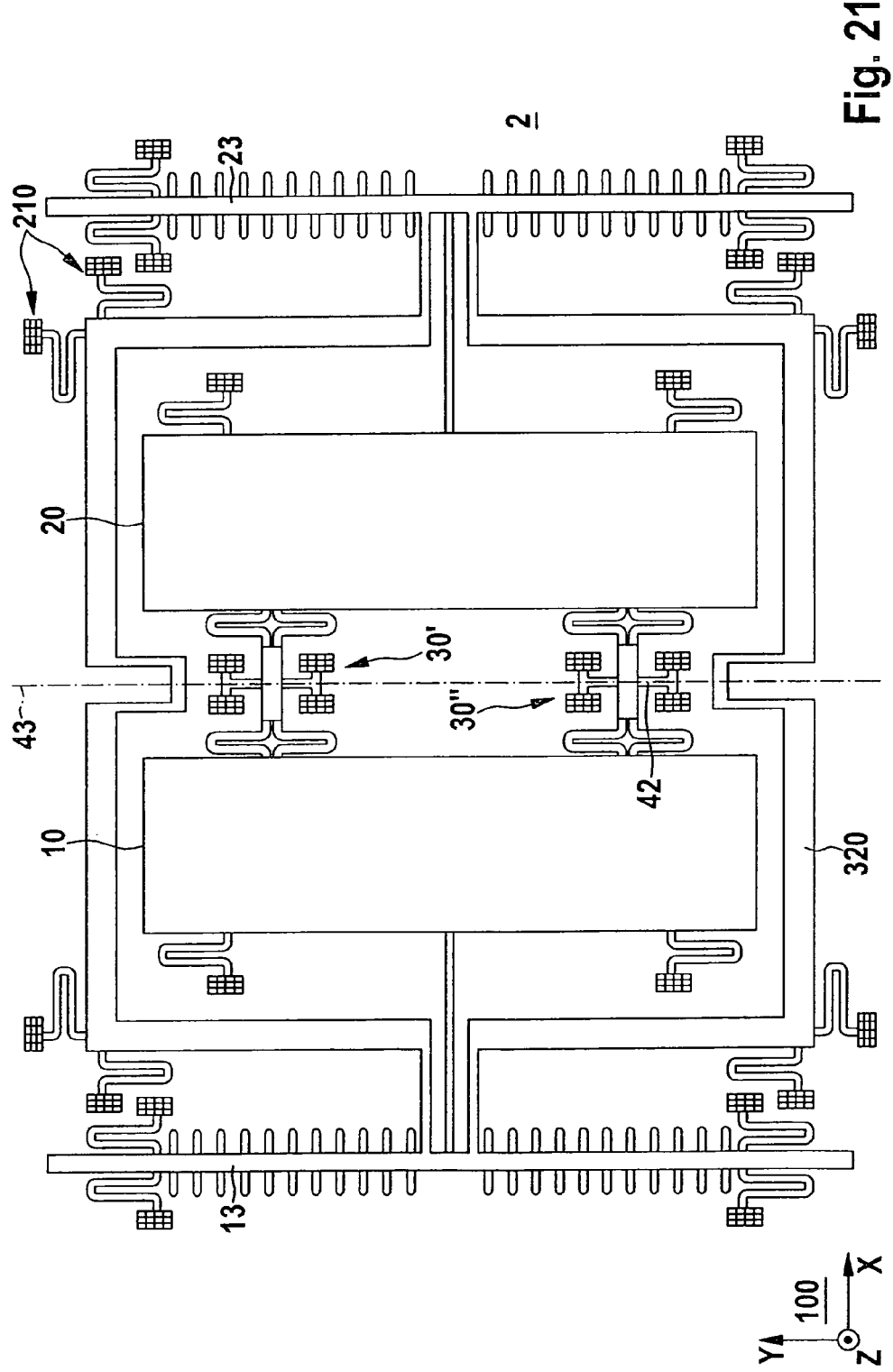
FIG. 21 shows a schematic top view of a yaw rate sensor according to a sixteenth specific embodiment of the present invention.

FIG. 21 shows a schematic top view of a yaw rate sensor 1 according to a sixteenth specific embodiment of the present invention, the sixteenth specific embodiment essentially resembling the fifteenth specific embodiment shown in FIG. 20, an additional rocker structure 30" in addition to rocker structure 30' being situated between first and second Coriolis elements 10, 20. Rocker structure 30' and additional rocker structure 30" are of the same design and are parallel to one another.

Figure 22A:
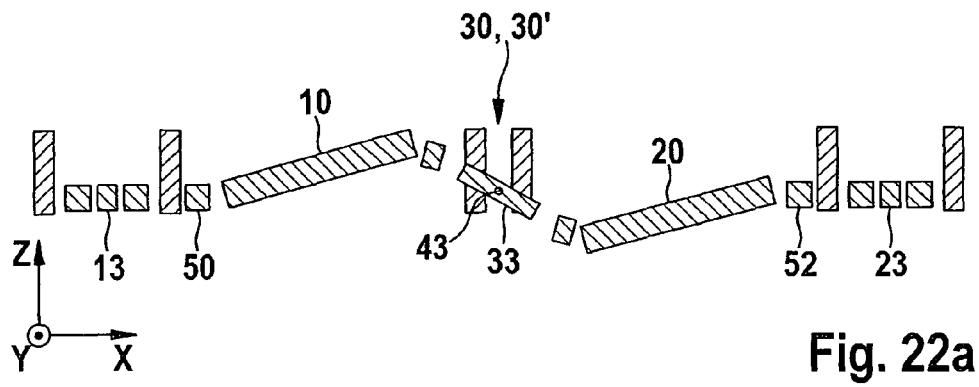
FIGS. 22a and 22b show a schematic sectional view of a schematic top view of a yaw rate sensor according to a seventeenth specific embodiment of the present invention.
Figure 22B:
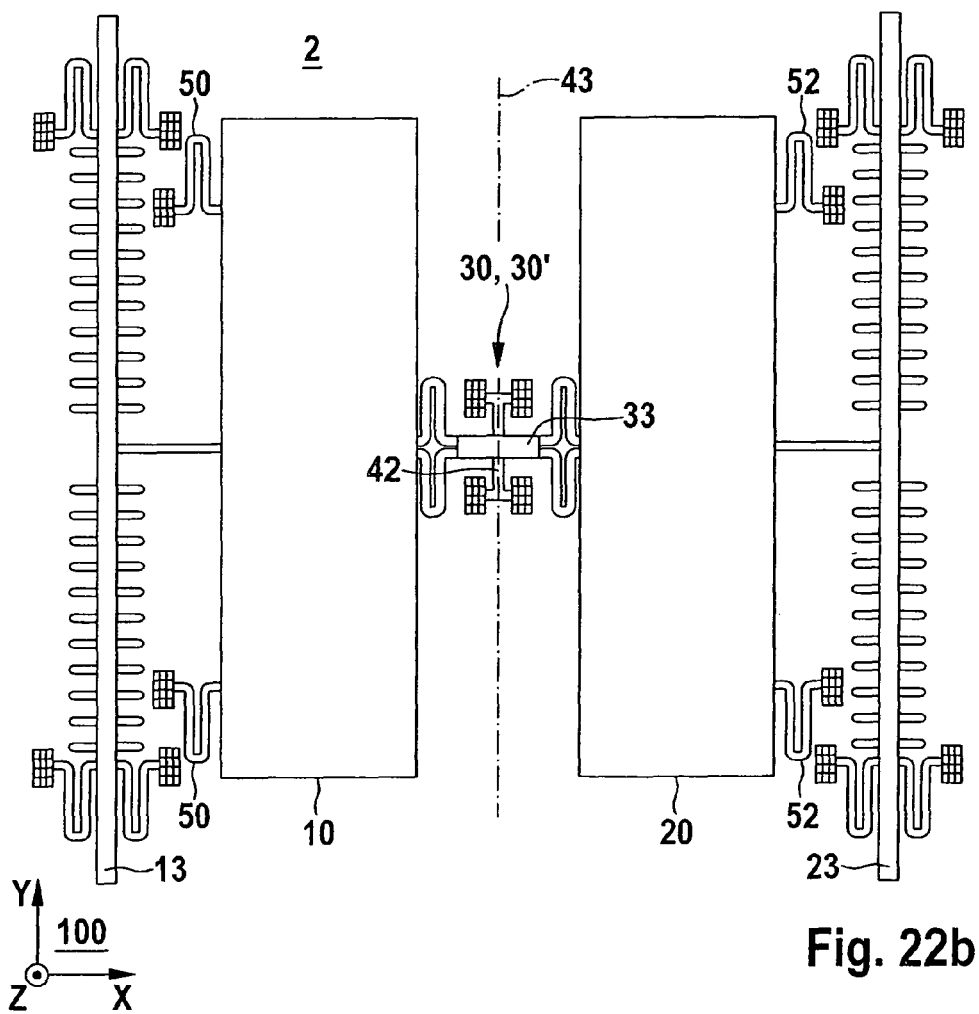

FIGS. 22a and 22b show a schematic sectional view and a schematic top view of a yaw rate sensor 1 according to a seventeenth specific embodiment of the present invention, the seventeenth specific embodiment essentially resembling the twelfth specific embodiment shown in FIG. 17, first and second mounting springs 50, 52 being designed to be stiffer along third direction Z, so that first and second mounting springs 50, 52 act as hinges for first and second Coriolis elements 10, 20. In the presence of a Coriolis force acting on first and second Coriolis elements 10, 20 along third direction Z, first and second Coriolis elements 10, 20 are pivoted in the direction of substrate 2 or in the opposite direction. This is illustrated in the sectional view in FIG. 23a in particular. In addition, the movable bearing of first and second Coriolis elements 10, 20 along first direction X is preferably not impaired.

What is claimed is:

1. A yaw rate sensor comprising:
a substrate, a first Coriolis element and a second Coriolis element, the first Coriolis element being drivable to a first vibration via first excitation means, and the second Coriolis element being drivable to a second vibration via second excitation means, and the first and second Coriolis elements being connected to one another via a spring structure, the spring structure including at least one rocker structure, the at least one rocker structure being anchored on the substrate by at least one spring element, wherein the spring element is connected to the substrate via anchoring elements, wherein the anchoring elements each include two partial anchoring elements, which are connected to one another via a spring coupling, the spring element being attached to the spring coupling.

2. The yaw rate sensor as recited in claim 1, wherein the rocker structure includes at least one first spring acting on the first Coriolis element and at least one second spring acting on the second Coriolis element, the first and second springs being coupled to one another via a coupling element of the rocker structure.

3. The yaw rate sensor as recited in claim 2, wherein the coupling element is designed to be less elastic than the first and second spring.

4. The yaw rate sensor as recited in claim 3, wherein the coupling element is designed to be stiff and the first and second springs are flexural springs.

5. The yaw rate sensor as recited in claim 2, wherein the first spring is designed to be more elastic parallel to the first vibration than perpendicularly to the first vibration or the second spring is designed to be more elastic parallel to the second vibration than perpendicularly to the second vibration.

6. The yaw rate sensor as recited in claim 2, wherein an additional first spring is situated between the first Coriolis element and the coupling element or an additional second spring is situated between the second Coriolis element and the coupling element.

7. The yaw rate sensor as recited in claim 2, wherein the first Coriolis element is attached to a first drive frame via first drive springs, and the second Coriolis element is attached to a second drive frame via second drive springs, first drive means being provided for driving the first drive frame and second drive means being provided for driving the second drive frame.

8. The yaw rate sensor as recited in claim 7, wherein the first Coriolis element includes a first Coriolis frame, which is connected to the first spring and is connected to a first Coriolis detection element via first detection springs, or the second Coriolis element includes a second Coriolis frame, which is connected to the second spring and is connected to a second Coriolis detection element via second detection springs.

9. The yaw rate sensor as recited in claim 8, wherein at least one of the first Coriolis element, the first drive frame and the first Coriolis detection element is attached to the substrate via first mounting springs or at least one of the second Coriolis element, the second drive frame and the second Coriolis detection element is attached to the substrate via second mounting springs.

10. The yaw rate sensor as recited in claim 9, wherein the first and second mounting springs are designed to be stiff perpendicularly to the main plane of extent of the substrate or parallel to a second direction.

11. The yaw rate sensor as recited in claim 2, wherein the first Coriolis element includes a first Coriolis frame, which is connected to the first spring and is connected to a first Coriolis detection element via first detection springs, or the second Coriolis element includes a second Coriolis frame, which is connected to the second spring and is connected to a second Coriolis detection element via second detection springs.

12. The yaw rate sensor as recited in claim 1, wherein the spring element includes a torsion spring.

13. The yaw rate sensor as recited in claim 12, wherein the torsion spring has a torsion axis which is oriented parallel to a main plane of extent of the substrate.

14. The yaw rate sensor as recited in claim 13, wherein the torsion axis is oriented parallel or perpendicularly to the first and second vibrations.

15. The yaw rate sensor as recited in claim 1, wherein the spring element includes a flexural spring, the rocker structure being pivotable about a pivot axis via the flexural spring, and the pivot axis being aligned essentially perpendicularly to the main plane of extent of the substrate.

16. The yaw rate sensor as recited in claim 1, wherein the spring coupling is oriented perpendicular to a torsion axis or a pivot axis.

17. A yaw rate sensor comprising:

a substrate, a first Coriolis element and a second Coriolis element, the first Coriolis element being drivable to a first vibration via first excitation means, and the second Coriolis element being drivable to a second vibration via second excitation means, and the first and second Coriolis elements being connected to one another via a spring structure, the spring structure including at least one rocker structure, the at least one rocker structure being anchored on the substrate by at least one spring element, wherein the first Coriolis element is attached to a first drive frame via first drive springs, and the second Coriolis element is attached to a second drive frame via second drive springs, first drive means being provided for driving the first drive frame and second drive means being provided for driving the second drive frame, wherein the first drive frame and the second drive frame are coupled to one another via a deflecting frame, the deflecting frame including a plurality of deflecting frame part elements, which are connected to one another via spring units in such a way that a vibration in phase opposition of the first and second drive frames parallel to the first and second vibrations produces a deformation of the deflecting frame in a plane parallel to the main plane of extent.

* * * * *